United States Patent
Saito et al.

(10) Patent No.: US 11,763,961 B2
(45) Date of Patent: Sep. 19, 2023

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/949,530

(22) Filed: Sep. 21, 2022

(65) Prior Publication Data
US 2023/0096348 A1 Mar. 30, 2023

(30) Foreign Application Priority Data
Sep. 24, 2021 (JP) ................... 2021-155998

(51) Int. Cl.
*H02G 3/04* (2006.01)
*H01B 7/00* (2006.01)
*B60R 16/02* (2006.01)

(52) U.S. Cl.
CPC ....... *H01B 7/0045* (2013.01); *B60R 16/0215* (2013.01); *H02G 3/0406* (2013.01); *H02G 3/0468* (2013.01)

(58) Field of Classification Search
CPC ............ B60R 16/0207; B60R 16/0215; H02G 3/0418; H02G 3/0468; H02G 3/0481; H02G 3/32; H02G 3/0406; H01B 7/0045
See application file for complete search history.

(56) References Cited

U.S. PATENT DOCUMENTS

| | | | |
|---|---|---|---|
| 7,278,190 B2 * | 10/2007 | Fischer | F16L 3/223 248/74.2 |
| 9,482,369 B2 * | 11/2016 | Sampson | F16L 3/127 |
| 2007/0128929 A1 * | 6/2007 | Oga | F16L 3/1025 439/578 |
| 2014/0196929 A1 | 7/2014 | Okuhara | |
| 2017/0133827 A1 * | 5/2017 | Sugino | H05K 9/0098 |
| 2019/0089142 A1 * | 3/2019 | Sugino | H02G 3/34 |

FOREIGN PATENT DOCUMENTS

| | | | | |
|---|---|---|---|---|
| FR | 2880211 A1 | * | 6/2006 | ............ F16L 3/1025 |
| JP | 2009038899 A | * | 2/2009 | ............... H02G 3/30 |
| JP | 2013-055760 A | | 3/2013 | |

* cited by examiner

*Primary Examiner* — Paresh Paghadal
(74) *Attorney, Agent, or Firm* — Oliff PLC

(57) ABSTRACT

A wire harness including: a wire harness main body that includes an electric wire and an exterior tube that encloses an outer circumferential surface of the electric wire; a path restricting member that is attached to an outer circumferential surface of the exterior tube and restricts a path of the wire harness main body; and a move restricting member that is attached to the outer circumferential surface of the exterior tube and restricts the path restricting member from moving in a lengthwise direction of the exterior tube relative to the exterior tube.

14 Claims, 11 Drawing Sheets

WIRE HARNESS

BACKGROUND

The present disclosure relates to a wire harness.

Conventionally, a wire harness that includes: a wire harness main body that includes an electric wire member and an exterior member that covers the electric wire member; and a path restricting member that is attached to an outer circumferential surface of the exterior member and is configured to restrict the path of the wire harness main body, has been known as a wire harness for a vehicle (for example, see JP 2013-55760A).

SUMMARY

Regarding the above wire harness, there is demand for an improvement in the positional accuracy of the path restricting member with respect to other members such as the exterior member.

An exemplary aspect of the disclosure provides a wire harness that is capable of improving the positional accuracy of a path restricting member.

A wire harness according to the present disclosure includes: a wire harness main body that includes an electric wire and an exterior tube that encloses an outer circumferential surface of the electric wire; a path restricting member that is attached to an outer circumferential surface of the exterior tube and restricts a path of the wire harness main body; and a move restricting member that is attached to the outer circumferential surface of the exterior tube and restricts the path restricting member from moving in a lengthwise direction of the exterior tube relative to the exterior tube, wherein: the exterior tube has a bellowed shape in which annular protrusions and annular recesses are alternatingly arranged in the lengthwise direction of the exterior tube, the path restricting member includes an insertion port that is open in a direction orthogonal to a lengthwise direction of the path restricting member, and extends over a full length of the path restricting member in the lengthwise direction of the path restricting member, and the move restricting member includes a first engagement that is fitted into one of the annular recesses and a second engagement that can engage with an end surface of the path restricting member in the lengthwise direction of the path restricting member.

A wire harness according to the present disclosure achieves the effect of improving the positional accuracy of the path restricting member.

DETAILED DESCRIPTION OF EMBODIMENTS

Description of Embodiments of Present Disclosure

Figure 1:
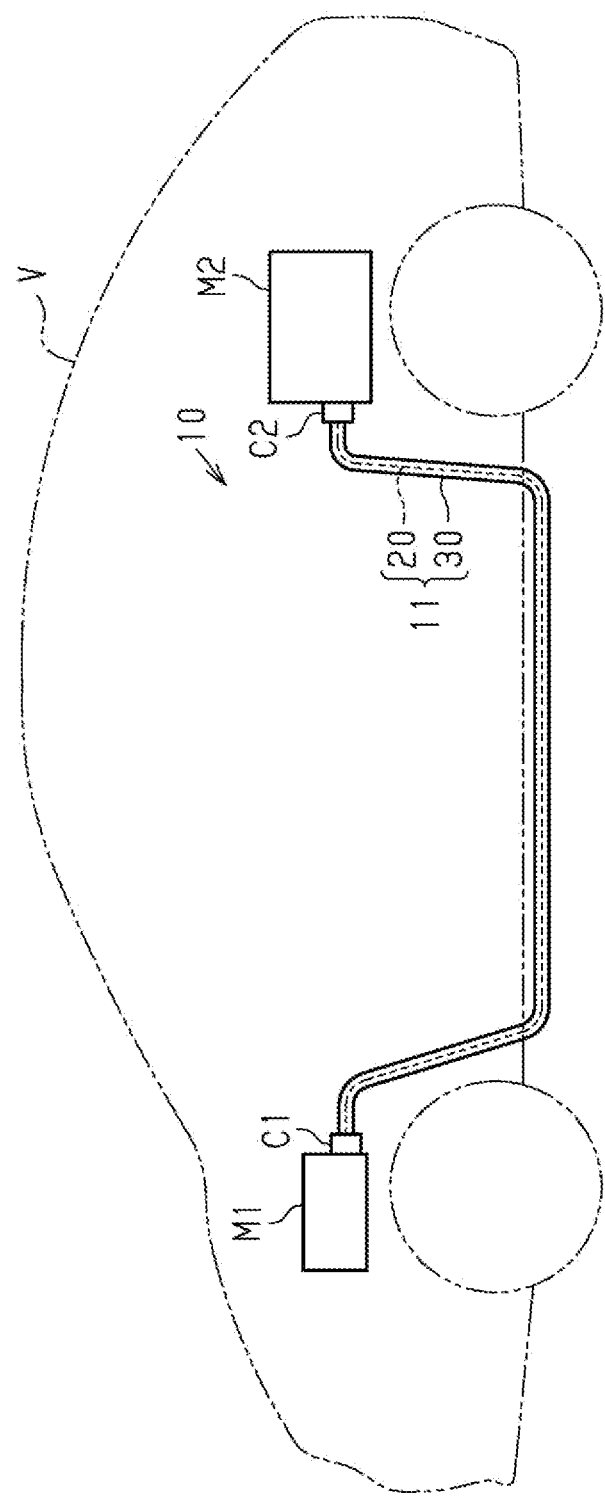
FIG. 1 is a schematic configuration diagram showing a wire harness according to an embodiment.

First, embodiments of the present disclosure will be listed and described.

[1] A wire harness according to the present disclosure includes: a wire harness main body that includes an electric wire member and an exterior member that encloses an outer circumferential surface of the electric wire member; a path restricting member that is attached to an outer circumferential surface of the exterior member and restricts a path of the wire harness main body; and a move restricting member that is attached to the outer circumferential surface of the exterior member and restricts the path restricting member from moving in a lengthwise direction of the exterior member relative to the exterior member, in which the exterior member has a bellowed shape in which annular protruding portions and annular recessed portions are alternatingly arranged in the lengthwise direction of the exterior member, the path restricting member includes an insertion port that is open in a direction orthogonal to a lengthwise direction of the path restricting member, and extends over a full length of the path restricting member in the lengthwise direction thereof, and the move restricting member includes a first engaging portion that is fitted into one of the annular recessed portions, and a second engaging portion that can engage with an end surface of the path restricting member in the lengthwise direction thereof.

This configuration provides a move restricting member that restricts the path restricting member from moving in the lengthwise direction of the exterior member relative to the exterior member. The move restricting member includes a first engaging portion that is fitted into one of the annular recessed portions, and a second engaging portion that can engage with an end surface of the path restricting member in the lengthwise direction thereof. With this configuration, the first engaging portion is fitted into the annular recessed portion, and thus the first engaging portion can engage with the inner surface of the annular recessed portion or a side surface of an annular protruding portion in the lengthwise direction of the exterior member. As a result, the move restricting member is prevented from moving in the lengthwise direction of the exterior member relative to the exterior member. Therefore, it is possible to prevent the move restricting member from being displaced in the lengthwise direction of the exterior member with respect to the exterior member. Furthermore, the end surface of the path restricting member in the lengthwise direction thereof engages with the second engaging portion in the lengthwise direction of the exterior member. As a result, the path restricting member is prevented from moving in the lengthwise direction of the exterior member relative to the exterior member and the move restricting member. Therefore, it is possible to prevent the path restricting member from being displaced in the lengthwise direction of the exterior member with respect to the exterior member. As a result, it is possible to improve the positional accuracy of the path restricting member with respect to the exterior member, and improve the positional accuracy of the path restricting member with respect to the wire harness main body. Therefore, it is possible to desirably restrict the path of the wire harness main body at a desired position, using the path restricting member.

[2] It is preferable that the move restricting member is a cable tie that includes: a band portion that extends in a first direction corresponding to a circumferential direction of the exterior member, has a thickness in a second direction corresponding to a radial direction of the exterior member, and has a width in a third direction corresponding to the lengthwise direction of the exterior member; and a lock portion that is integrated with the band portion and is provided on a first end portion of the band portion in the first direction, the band portion has a first end surface that faces an outer surface of the exterior member in the second direction, and a second end surface that is provided opposite to the first end surface in the second direction, and the first engaging portion is a protruding portion that protrudes from the first end surface toward the exterior member. With this configuration, the cable tie that includes the band portion and the lock portion can restrict the path restricting member from moving in the lengthwise direction of the exterior member relative to the exterior member. With the cable tie, it is easy to wind the band portion around the outer circumferential surface of the exterior member, and therefore it is possible to improve the assembly workability of the wire harness. Also, as a result of the protruding portion provided on the first end surface of the band portion being fitted into one of the annular recessed portions, the protruding portion and the exterior member engage with each other in the lengthwise direction of the exterior member. As a result, it is possible to desirably prevent the move restricting member from moving in the lengthwise direction of the exterior member relative to the exterior member.

[3] It is preferable that the band portion has a larger size than the protruding portion in the third direction, and the band portion has a size with which the band portion cannot be fitted into the annular recesses. With this configuration, the band portion has a size with which the band portion cannot be fitted into the annular recesses, and therefore the first end surface of the band portion can be brought into contact with the outer surface of the exterior member, specifically the outer surface of an annular protruding portion. As a result, it is possible to easily position the move restricting member in a redial direction of the exterior member, and stably wind the band portion around the outer surface of the exterior member.

[4] It is preferable that the band portion has a third end surface that faces an end surface of the path restricting member in the lengthwise direction thereof, in the third direction, and a fourth end surface that is provided opposite to the third end surface in the third direction, and the second engaging portion is the third end surface. With this configuration, the end surface of the path restricting member in the lengthwise direction thereof engages with the third end surface of the band portion, in the lengthwise direction of the exterior member. As a result, the path restricting member is prevented from moving in the lengthwise direction of the exterior member relative to the exterior member and the move restricting member. Therefore, it is possible to prevent the path restricting member from being displaced in the lengthwise direction of the exterior member with respect to the exterior member.

[5] It is preferable that the move restricting member is provided with a protruding portion that protrudes to a position outside the band portion with respect to the third end surface of the band portion, in the third direction, and the protruding portion can be brought into contact with an outer surface of the path restricting member. With this configuration, the move restricting member is provided with a protruding portion that protrudes to a position outside the band portion with respect to the third end surface of the band portion and can be brought into contact with an outer surface of the path restricting member. With the protruding portion, it is possible to cover the path restricting member from the outside of the path restricting member. Therefore, for example, it is possible to desirably prevent the path restricting member from moving in the lengthwise direction of the exterior member, climbing over the move restricting member. Therefore, it is possible to desirably prevent the path restricting member from being displaced in the lengthwise direction of the exterior member with respect to the exterior member.

[6] It is preferable that the protruding portion includes a base end portion that extends in the third direction and is one end portion in the third direction connected to the band portion, and a leading end portion that is provided opposite to the base end portion in the third direction, and the protruding portion is elastically deformable so that the leading end portion can be shifted in the second direction with respect to the base end portion. With this configuration, the protruding portion is elastically deformable so that the leading end portion of the protruding portion can be shifted in the second direction with respect to the base end portion of the protruding portion. Therefore, for example, even if the external size of the path restricting member is changed, the amount of elastic deformation of the first protruding portion is changed and the leading end portion of the protruding portion can be desirably brought into contact with the outer surface of the path restricting member. In other words, it is possible to share one type of move restricting member for a plurality of types of path restricting members that have external shapes with different sizes, as a result of the amount of elastic deformation of each first protruding portion being changed.

[7] It is preferable that the move restricting member is provided with a plurality of protruding portions, and the plurality of protruding portions are provided at intervals in the first direction of the band portion. With this configuration, the outer surface of the path restricting member is covered by the plurality of protruding portions that are provided at intervals in the first direction of the band portion. Therefore, it is possible to cover the outer surface of the path restricting member in a wide range in the circumferential direction of the exterior member, using the plurality of protruding portions. As a result, for example, it is possible to desirably prevent the path restricting member from moving in the lengthwise direction of the exterior member, climbing over the move restricting member. Therefore, it is possible to desirably prevent the path restricting member from being displaced in the lengthwise direction of the exterior member with respect to the exterior member.

[8] It is preferable that the leading end portion of the protruding portion includes a wide portion that has a larger size in the first direction than the base end portion of the protruding portion, and the wide portion can be brought into contact with an outer surface of the path restricting member.

With this configuration, the wide portion covers the outer surface of the path restricting member. Therefore, it is possible to cover the outer surface of the path restricting member in a wide range in the circumferential direction of the exterior member, using the wide portion. As a result, for example, it is possible to desirably prevent the path restricting member from moving in the lengthwise direction of the exterior member, climbing over the move restricting member. Therefore, it is possible to desirably prevent the path restricting member from being displaced in the lengthwise direction of the exterior member with respect to the exterior member.

[9] It is preferable that, when the protruding portion is the first protruding portion, the move restricting member is provided with a second protruding portion that protrudes to a position outside the band portion with respect to the fourth end surface of the band portion, in the third direction, and the second protruding portion extends in an opposite direction than the first protruding portion, in the third direction, and can be brought into contact with an outer surface of the path restricting member. With this configuration, the move restricting member is provided with the first protruding portion and the second protruding portion that respectively protrude from the two sides of the band portion in the third direction. Therefore, it is possible to eliminate the restriction on the orientation of the band portion in the third direction when attaching the move restricting member to the outer circumferential surface of the exterior member. For example, even if the move restricting member is attached to the outer surface of the exterior member such that the fourth end surface of the band portion faces an end surface of the path restricting member in the lengthwise direction thereof, the second protruding portion can be brought into contact with the outer surface of the path restricting member. As a result, it is possible to improve the attachment workability of the move restricting member, and accordingly, it is possible to improve the assembly workability of the wire harness.

[10] It is preferable that the band portion includes a first end portion to which the lock portion is connected, and a second end portion that is provided opposite to the first end portion in the first direction, the second end portion is provided with a plurality of third engaging portions provided at intervals in the first direction of the band portion, the lock portion is provided with an insertion hole into which the second end portion of the band portion can be inserted, and a fourth engaging portion that is provided on an inner surface of the insertion hole and can engage with the third engaging portion, and the first engaging portion is not provided on the second end portion. With this configuration, the second end portion of the band portion is inserted into the insertion hole of the lock portion, the fourth engaging portion of the lock portion is engaged with one third engaging portion of the plurality of third engaging portions, and thus the band portion can be locked to the lock portion. At this time, it is possible to match the size of the inner circumference of the move restricting member to the external size of the exterior member by changing the degree of insertion of the band portion into the lock portion. In other words, it is possible to share one type of move restricting member for a plurality of types of exterior members with different external sizes, by adjusting the degree of insertion of the band portion into the lock portion. Also, the second end portion of the band portion where the third engaging portion is provided is not provided with the first engaging portion. Therefore, it is possible to prevent the first engaging portion from interfering with the engagement of the third engaging portion and the fourth engaging portion.

DETAILS OF EMBODIMENTS OF PRESENT DISCLOSURE

The following describes specific examples of a wire harness according to the present disclosure with reference to the drawings. In each drawing, for convenience of explanation, some parts of the configuration may be exaggerated or simplified. In addition, the dimensional ratio of each part may differ in each drawing. The term "orthogonal" in the present specification is not limited to being strictly orthogonal, but may be substantially orthogonal within the range in which the actions and effects of the embodiments can be exhibited. Also, the term "tubular" used in descriptions included in the present specification is not limited to referring to a shape with a circumferential wall that is formed so as to be continuous all the way in the circumferential direction thereof, but may refer to a tubular shape constituted by a combination of a plurality of parts, or a shape with a cutout in a portion in a circumferential direction thereof, such as a C-shape. Note that examples of a "tubular" shape include, but are not limited to, a circular shape, an ellipsoidal shape, and a polygonal shape with sharp or rounded corners. Also, the term "annular" used in descriptions included in the present specification may refer to any structure that provides a loop, a continuous shape with no ends, and a typical loop shape with a C-shaped gap. Note that examples of an "annular" shape include, but are not limited to, a circular shape, an ellipsoidal shape, and a polygonal shape with sharp or rounded corners. Also, "(to) face" in the present specification means that surfaces or members are located right in front of each other, are refers to not only cases in which the entirety of the surfaces or members are located right in front of each other, but also cases in which portions of the surfaces or members are located right in front of each other. Also, "(to) face" in the present specification means both a case in which a member different from two portions is interposed between the two portions and a case in which nothing is interposed between the two portions. It should be noted that the present disclosure is not limited to these examples, and is indicated by the scope of claims, and is intended to include all modifications within the meaning and scope equivalent to the scope of claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, with each other. The wire harness 10 is formed in an elongated shape so as to extend in a front-rear direction of the vehicle V, for example. The wire harness 10 is routed in the vehicle V so that, for example, an intermediate portion of the wire harness 10 in the lengthwise direction thereof passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that encloses the outer circumferential surface of the electric wire member 20. The wire harness 10 has connectors C1 and C2 that are respectively attached to two end portions of the electric wire member 20. One end portion of the electric wire member 20 in the lengthwise direction thereof is connected to the inverter M1 via the connector C1, and the other end portion of the electric wire member 20 in the lengthwise direction thereof is connected to the high-voltage battery M2 via the connector C2.

Figure 2:
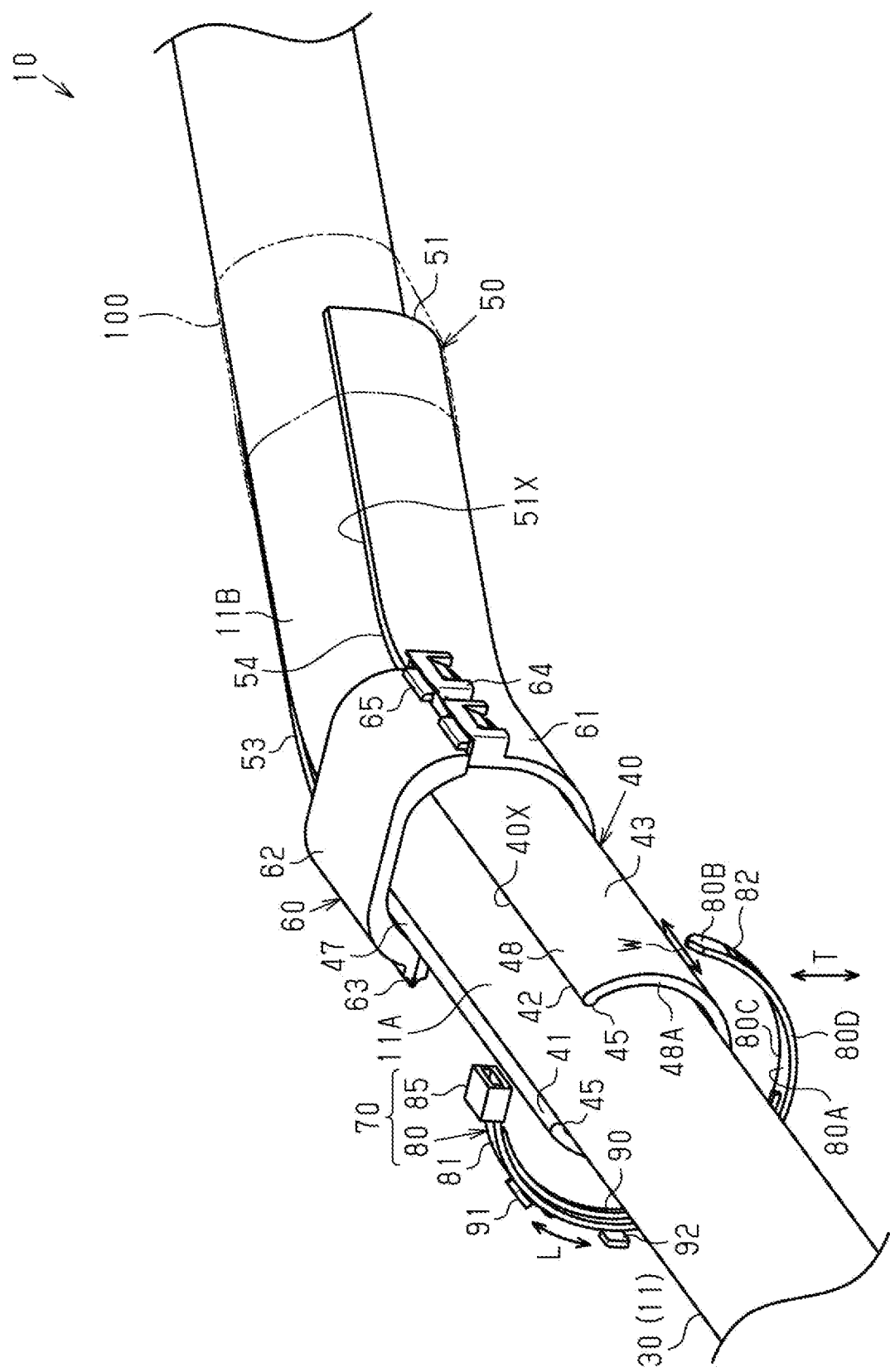
FIG. 2 is a schematic perspective view showing a wire harness according to an embodiment.
Figure 3:
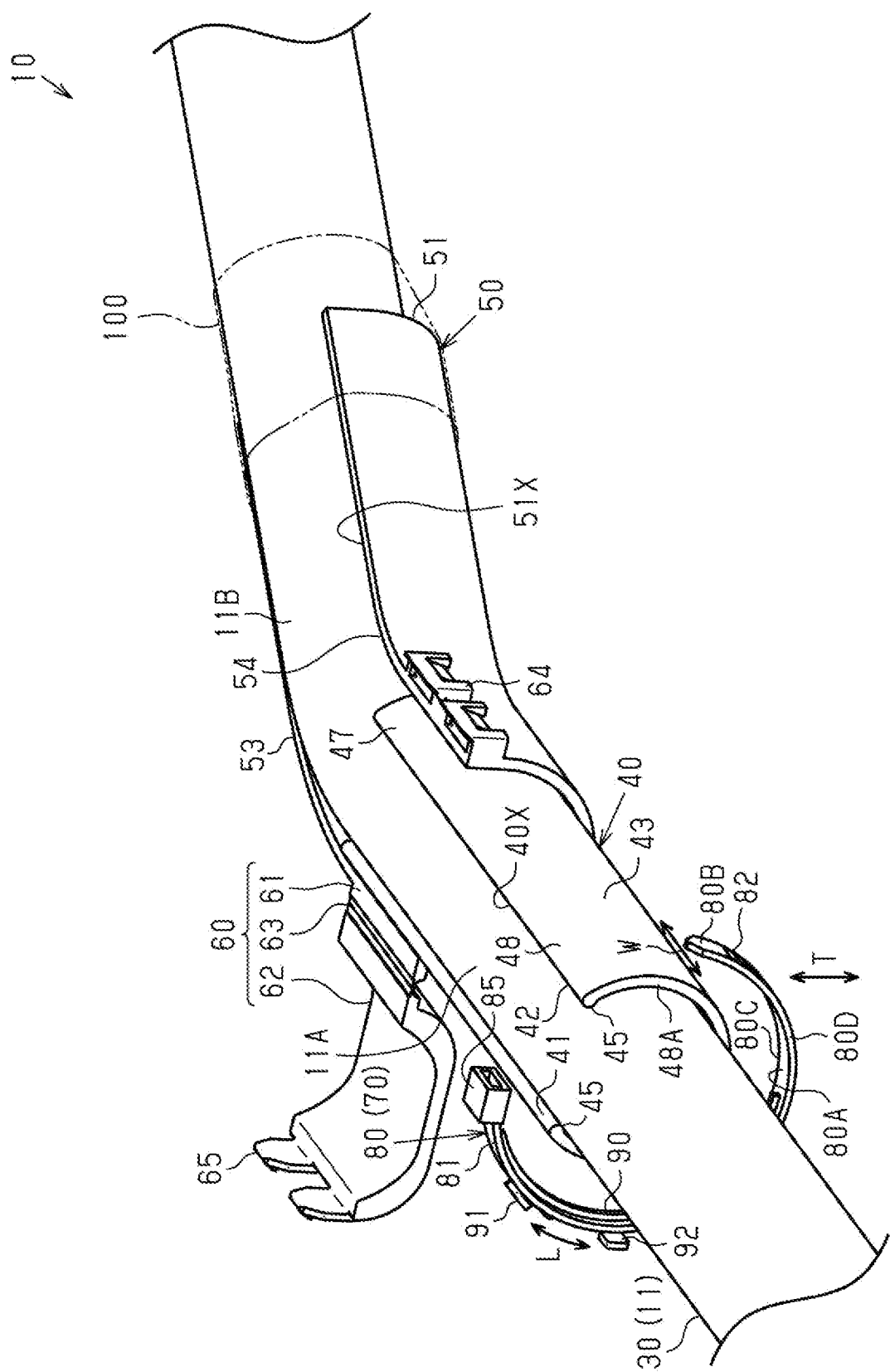
FIG. 3 is a schematic perspective view showing a wire harness according to an embodiment.

As shown in FIGS. 2 and 3, the wire harness 10 includes a path restricting member 40 that is attached to the outer circumferential surface of the exterior member 30 and a path restricting member 50 that is attached to the outer circumferential surface of the exterior member 30. The path restricting members 40 and 50 restrict the path along which the wire harness main body 11 is routed. The wire harness 10 includes a move restricting member 70 that restricts the path restricting member 40 from moving. Note that the path restricting members 40 and 50 and the move restricting member 70 are omitted from FIG. 1.

Configuration of Electric Wire Member 20

Figure 4:
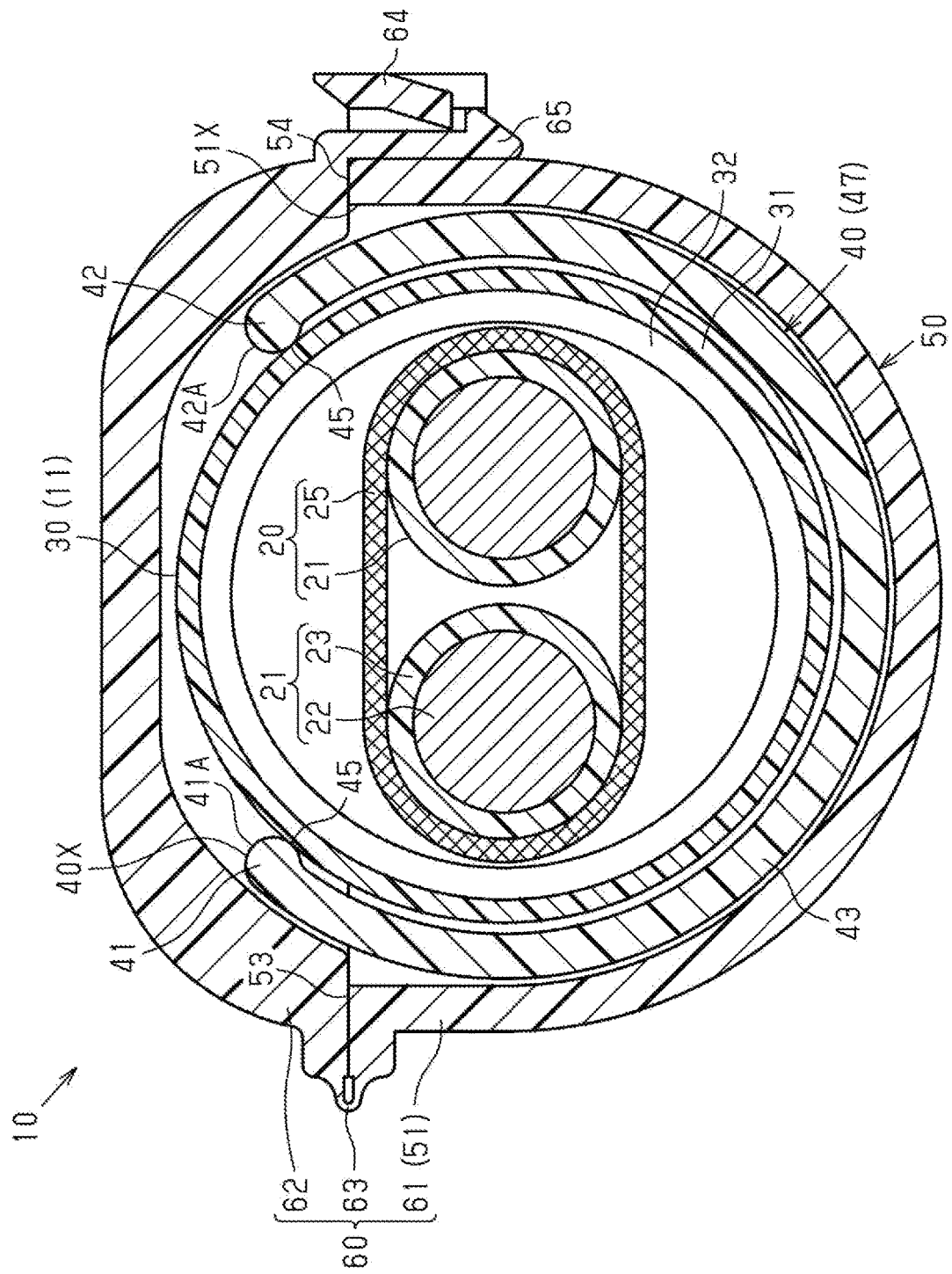
FIG. 4 is a schematic horizontal cross-sectional view showing a wire harness according to an embodiment.
Figure 5:
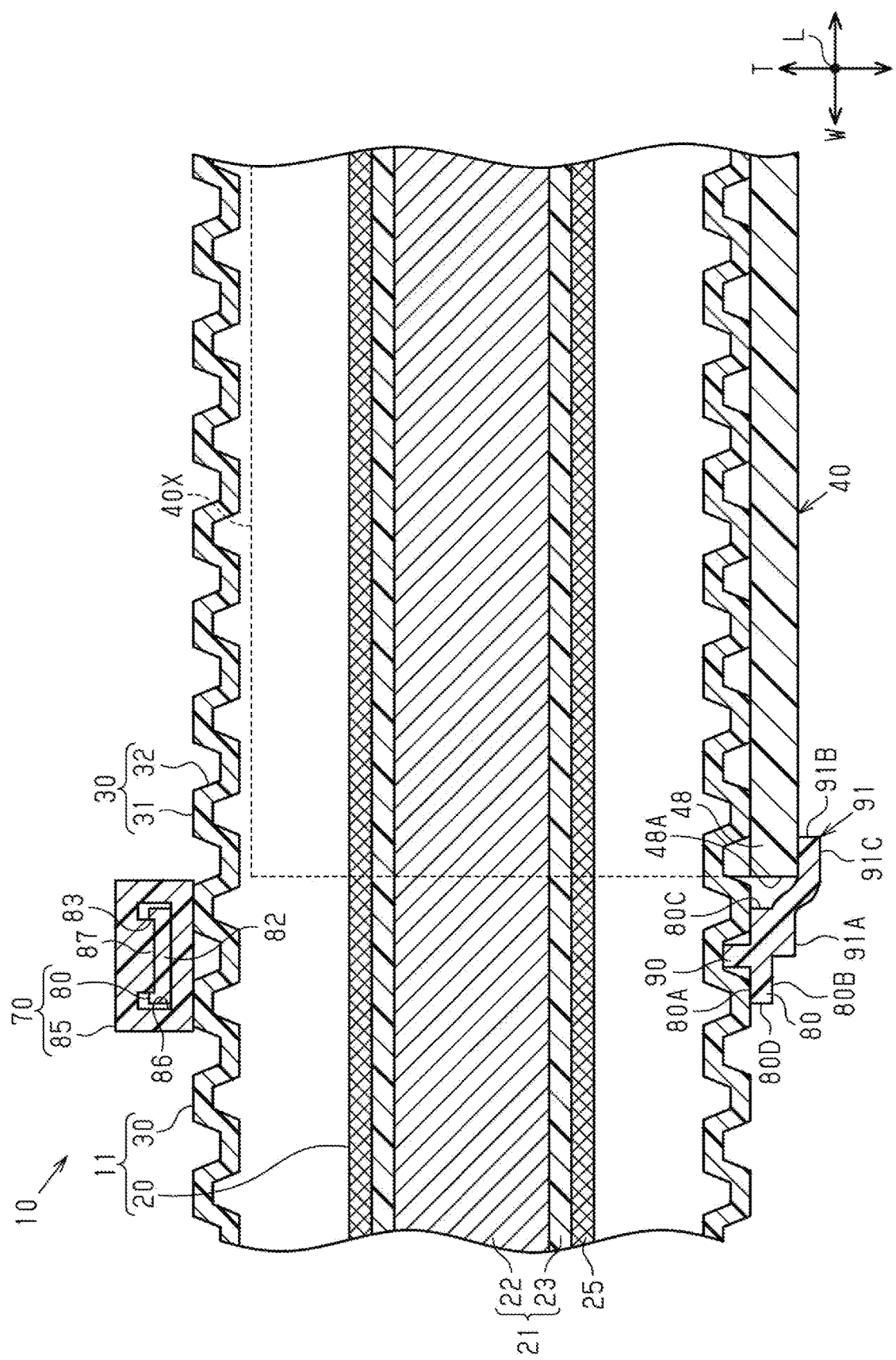
FIG. 5 is a schematic cross-sectional view showing a wire harness according to an embodiment.

As shown in FIGS. 4 and 5, for example, the electric wire member 20 includes one or more electric wires 21 (two in the present embodiment) and a braided member 25 that collectively encloses the outer circumferential surfaces of the plurality of electric wires 21.

As shown in FIG. 4, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, i.e., the lateral cross-sectional shape of each wire 21, may be any shape. The lateral cross-sectional shape of each electric wire 21 may be, for example, a circular shape, a semicircular shape, a polygonal shape, a square shape, a flat shape, or the like. The lateral cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

The exterior member 30 has a tubular shape that encloses all the way around the outer circumferential surface of the electric wire member 20. The exterior member 30 in the present embodiment is formed in a cylindrical shape. The exterior member 30 is, for example, provided with a circumferential wall that is formed so as to be continuous all the way around the circumferential surface of the exterior member 30. The exterior member 30 is, for example, sealed all the way around the circumferential surface of the exterior member 30. The exterior member 30 has, for example, a function of protecting the electric wire member 20 from flying objects and water droplets.

The exterior member 30 is, for example, flexible and easy to bend. Examples of the flexible exterior member 30 include a resin corrugated tube and a rubber waterproof cover.

As shown in FIG. 5, the exterior member 30 in the present embodiment is a resin corrugated tube that has a bellowed shape in which the diameter repeatedly increases and decreases in the lengthwise direction of the exterior member 30. That is to say, the exterior member 30 in the present embodiment has a bellowed structure in which annular protrusions 31 and annular recesses 32 are alternatingly provided in the lengthwise direction of the exterior member 30. The annular protrusions 31 and the annular recesses 32 each have an annular shape that extends around the exterior member 30 in the circumferential direction thereof, for example. As the material of the exterior member 30, a synthetic resin such as polyolefin, polyamide, polyester, or an ABS resin may be used, for example. In FIGS. 1 to 3, the exterior member 30 is simplified in order to simplify the drawings.

Configurations of Path Restricting Members 40 and 50

As shown in FIGS. 2 and 3, the path restricting members 40 and 50 each hold the exterior member 30. The path restricting members 40 and 50 are each more rigid than the exterior member 30, for example. Compared to the outer member 30, the path restricting members 40 and 50 are each more rigid so as to be less bendable in the direction orthogonal to the lengthwise direction of the wire harness main body 11. With this configuration, the path restricting members 40 and 50 each restrict the path of the wire harness main body 11. For example, the path restricting members 40 and 50 each assist the exterior member 30 so that the wire harness main body 11 does not bend under its own weight or the like and does not deviate from a desired path. The path restricting members 40 and 50 are respectively provided along portions of the wire harness main body 11 in the lengthwise direction thereof. Note that one or more path restricting members 40 and one or more path restricting members 50 may be provided depending on the path of the wire harness main body 11.

For example, the path restricting member 40 is attached to the outer circumferential surface of the exterior member 30 along a straight section 11A, which is a straight section of the path of the wire harness main body 11. The path restricting member 40 restricts the path of the wire harness main body 11 in the straight section 11A. Here, the straight section 11A is a section in which the path of the wire harness main body 11 extends straight in one direction. For example, the path restricting member 50 is attached to the outer circumferential surface of the exterior member 30 along a bent section 11B, which is a bent section of the path of the wire harness main body 11. The path restricting member 50 restricts the path of the wire harness main body 11 in the bent section 11B. Here, the bent section 11B is a section in which the path of the wire harness main body 11 is bent two-dimensionally or three-dimensionally.

Configuration of Path Restricting Member 40

As shown in FIG. 4, the path restricting member 40 covers a portion of the outer circumferential surface of the exterior member 30 in the circumferential direction of the exterior member 30. The path restricting member 40 has a tubular shape that covers a portion of the outer circumferential surface of the exterior member 30 in the circumferential direction of the exterior member 30. For example, the path restricting member 40 covers a range larger than half of the outer circumferential surface of the exterior member 30. That is to say, the path restricting member 40 covers a range larger than half of the outer circumferential surface of the exterior member 30 in the circumferential direction of the exterior member 30. The path restricting member 40 has a C-like horizontal cross-sectional shape as a whole. For example, the horizontal cross-sectional shape of the path restricting member 40 is uniform over substantially the entirety of the path restricting member 40 in the lengthwise direction thereof. As shown in FIG. 3, the path restricting member 40 extends along the path in the straight section 11A, and is formed in a shape that extends straight in one direction.

The path restricting member 40 is made of metal or resin, for example. The path restricting member 40 in the present embodiment is made of resin. As the material of the path restricting member 40, a synthetic resin such as polypropylene, polyamide, or polyacetal may be used, for example. The path restricting member 40 may be manufactured using a well-known manufacturing method such as extrusion molding or injection molding, for example.

The path restricting member 40 is provided with an insertion port 40X that is open in a direction orthogonal to the lengthwise direction of the path restricting member 40. The path restricting member 40 includes an end portion 41 and an end portion 42 that are two end portions of the path restricting member 40 in the circumferential direction thereof and define the insertion port 40X. The path restricting member 40 includes a coupling portion 43 that couples the end portion 41 and the end portion 42 to each other. In other words, the path restricting member 40 includes a coupling portion 43 that is formed so as to cover a portion of the exterior member 30 in the circumferential direction thereof, the end portion 41 and the end portion 42 that are provided at two end portions of the coupling portion 43, and the insertion port 40X that is defined by the end portion 41 and the end portion 42.

As shown in FIG. 4, the coupling portion 43 constitutes a main portion of the path restricting member 40. The thickness of the coupling portion 43 in a radial direction is uniform in the circumferential direction of the path restricting member 40, for example. The horizontal cross-sectional shape of the coupling portion 43 is a shape that matches the outer surface of the exterior member 30. For example, the end portion 41, the end portion 42, and the coupling portion 43 each have an arc-like horizontal cross-sectional shape.

The end portion 41 and the end portion 42 are provided opposite to each other in the circumferential direction of the path restricting member 40. The end portion 41 and the end portion 42 are separated from each other in the circumferential direction of the path restricting member 40 with the insertion port 40X being interposed therebetween. In other words, the gap between the end portion 41 and the end portion 42 in the circumferential direction of the path restricting member 40 is provided as the insertion port 40X. As described above, the path restricting member 40 is formed in a C shape in which the insertion port 40X is provided at a portion of the path restricting member 40 in the circumferential direction thereof.

The end portion 41 includes a leading end 41A. The end portion 42 includes a leading end 42A. The leading ends 41A and 42A define the insertion port 40X. In other words, the leading ends 41A and 42A constitute the inner surface of the insertion port 40X. The leading ends 41A and 42A are formed in a curved shape when seen in the lengthwise direction of the path restricting member 40. That is to say, the leading ends 41A and 42A each have a curved horizontal cross-sectional shape. The leading ends 41A and 42A in the present embodiment each have a semicircular horizontal cross-sectional shape.

For example, the path restricting member 40 includes protruding portions 45 (protrusion) that respectively protrude from the inner surfaces of the end portions 41 and 42. The protruding portions 45 each protrude toward the exterior member 30 inserted into the path restricting member 40, and can come into contact with the outer surface of the exterior member 30. For example, the protruding portions 45 each come into contact with the outer surface of one of the annular protrusions 31 of the exterior member 30. For example, the protruding portions 45 respectively protrude from the inner surfaces of the leading ends 41A and 42A. For example, the protruding portions 45 each have a curved horizontal cross-sectional shape. The protruding portions 45 in the present embodiment each have a semicircular horizontal cross-sectional shape. The protruding portions 45 extend in the lengthwise direction of the path restricting member 40. For example, the protruding portions 45 each extend over the full length of the path restricting member 40 in the lengthwise direction thereof.

For example, the protruding portions 45 each press the exterior member 30 from the outside of the exterior member 30. For example, the exterior member 30 is elastically held by the two protruding portions 45 and the coupling portion 43. As a result, the path restricting member 40 is firmly coupled to the exterior member 30. Therefore, the path restricting member 40 attached to the outer circumferential surface of the exterior member 30 is prevented from moving in the lengthwise direction of the exterior member 30.

The opening width of the insertion port 40X, i.e., the shortest distance between the end portion 41 and the end portion 42, is smaller than the outer diameter of the exterior member 30, for example.

As shown in FIG. 3, the insertion port 40X extends in the lengthwise direction of the path restricting member 40. The insertion port 40X extends over the full length of the path restricting member 40 in the lengthwise direction thereof. That is to say, the insertion port 40X is formed so as to be open in a direction orthogonal to the lengthwise direction of the path restricting member 40 and so as to be open at the two ends of the path restricting member 40 in the lengthwise direction thereof.

As a result of inserting the exterior member 30 into the insertion port 40X in a direction orthogonal to the lengthwise direction of the path restricting member 40, the path restricting member 40 elastically deforms and the opening width of the insertion port 40X increases. When the exterior member 30 is inserted into the path restricting member 40, the path restricting member 40 elastically deforms to return to the original shape thereof. As a result, the opening width of the insertion port 40X becomes smaller than the outer diameter of the exterior member 30, and the restricting member 40 is attached to the outer circumferential surface of the exterior member 30.

The restricting member 40 includes an end portion 47 and an end portion 48 that are two end portions of the path restricting member 40 in the lengthwise direction thereof. The end portion 48 has an end surface 48A in the lengthwise direction of the path restricting member 40.

Configuration of Path Restricting Member 50

As shown in FIGS. 2 and 3, the path restricting member 50 is bent along the shape of the bent section 11B. The path restricting member 50 is made of metal or resin, for example. The path restricting member 50 in the present embodiment is made of resin. As the material of the path restricting member 50, a synthetic resin such as polypropylene, polyamide, or polyacetal may be used, for example. The path restricting member 50 may be manufactured using injection molding or the like, for example.

The path restricting member 50 includes a main body portion 51 and a covering portion 60 that covers a portion of the path restricting member 40 in the lengthwise direction thereof.

For example, the main body portion 51 has a bent shape extending along the path of the bent section 11B. The main body portion 51 covers a portion of the outer circumferential surface of the exterior member 30 in the circumferential direction of the exterior member 30. The main body portion 51 covers approximately half the range of the outer circumferential surface of the exterior member 30. For example, the main body portion 51 has a substantially semi-cylindrical shape.

The main body portion 51 includes an end portion 53 and an end portion 54 that are two end portions of the main body portion 51 in the circumferential direction thereof. The main body portion 51 is provided with an insertion port 51X that is defined by the end portion 53 and the end portion 54. The insertion port 51X is an opening between the end portion 53 and the end portion 54. The insertion port 51X is open in a direction orthogonal to the lengthwise direction of the path restricting member 50. The insertion port 51X extends over the full length of the path restricting member 50 in the lengthwise direction thereof. The opening width of the insertion port 51X, i.e., the shortest distance between the end portion 53 and the end portion 54, is equal to the outer diameter of the exterior member 30, or is smaller than the outer diameter of the exterior member 30, for example. The exterior member 30 and the path restricting member 40 are inserted into the insertion port 51X in a direction orthogonal to the lengthwise direction of the path restricting member 50.

For example, the covering portion 60 is provided at an end portion of the path restricting member 50 in the lengthwise direction thereof. For example, the covering portion 60 covers the outer circumferential surface of the end portion 47 of the path restricting member 40. The covering portion 60 includes a covering main body portion 61 that is an end portion of the main body portion 51 in the lengthwise direction thereof, and a lid portion 62 that is coupled to the covering main body portion 61. The covering main body portion 61 is a portion of the main body portion 51. For example, the lid portion 62 is formed so as to be integrated with the covering main body portion 61. For example, the horizontal cross-sectional shape of the inner surface of the lid portion 62 is a shape that matches the outer surface of the exterior member 30. For example, the lid portion 62 is formed in a substantially semi-ellipsoidal cylinder shape.

As shown in FIG. 3, the lid portion 62 covers a portion of the insertion port 51X of the main body portion 51 in the lengthwise direction of the path restricting member 50. For example, the lid portion 62 covers the insertion port 51X only in the covering main body portion 61 in the lengthwise direction of the main body portion 51.

For example, the covering portion 60 has a hinge portion 63 that connects the covering main body portion 61 and the lid portion 62 with each other. The hinge portion 63 connects one end of the covering main body portion 61 in the circumferential direction thereof and one end of the lid portion 62 in the circumferential direction thereof, with each other. The other end of the covering main body portion 61 in the circumferential direction thereof is provided with one or more lock portions 64. The other end of the lid portion 62 in the circumferential direction thereof is provided with one or more claw portions 65.

The lid portion 62 is rotatable about the hinge portion 63, which serves as an axis, between the open position shown in FIG. 3 and the closed position shown in FIG. 2. As shown in FIG. 4, when the lid portion 62 is at the closed position, the claw portions 65 are caught on the lock portions 64. As a result, the lid portion 62 is held in the closed position. Thus, the covering main body portion 61 and the lid portion 62 are coupled to each other. In the state where the covering main body portion 61 and the lid portion 62 are coupled to each other, the covering portion 60 has an annular shape that collectively encloses the respective outer circumferential surfaces of the exterior member 30 and the end portion 47 of the path restricting member 40. At the closed position, the lid portion 62 covers the insertion port 51X in the covering main body portion 61, and covers the insertion port 40X at the end portion 47.

Configuration of Move Restricting Member 70

As shown in FIG. 2, the move restricting member 70 is attached to the outer circumferential surface of the exterior member 30. The move restricting member 70 restricts the path restricting member 40 from moving in the lengthwise direction of the exterior member 30 relative to the exterior member 30. The move restricting member 70 is provided in the vicinity of the end portion 48 of the path restricting member 40 in the lengthwise direction of the wire harness main body 11. The move restricting member 70 is a cable tie made of metal or resin, for example. The move restricting member 70 in the present embodiment is a cable tie made of resin. As the material of the move restricting member 70, polypropylene, polyetheretherketone, fluororesin, or the like may be used, for example.

The move restricting member 70 includes a band portion 80 (band) and a lock portion 85 (lock) that is provided at one end of the band portion 80 in the length direction thereof. For example, the move restricting member 70 is a single part in which the band portion 80 and the lock portion 85 are formed integrally with each other.

The band portion 80 is formed in an elongated flat plate shape with a rectangular cross section as a whole. The band portion 80 is wound around the outer surface of the exterior member 30. The band portion 80 extends in a first direction L corresponding to the circumferential direction of the exterior member 30, has a thickness in a second direction T corresponding to a radial direction of the exterior member 30, and has a width in a third direction W corresponding to the lengthwise direction of the exterior member 30.

The band portion 80 includes a first end portion 81 and a second end portion 82 that are two end portions of the band portion 80 in the first direction L thereof. The first end portion 81 is connected to the lock portion 85. The second end portion 82 is provided opposite to the first end portion 81 in the first direction L of the band portion 80. The band portion 80 has a first end surface 80A and a second end surface 80B that are two end surfaces of the band portion 80 in the second direction T thereof, and a third end surface 80C and a fourth end surface 80D that are two end surfaces of the band portion 80 in the third direction W thereof. In a state where the band portion 80 is wound around the outer surface of the exterior member 30, the first end surface 80A is an inner surface that faces the outer surface of the exterior member 30, and the second end surface 80B is an outer surface that is provided opposite to the first end surface 80A in the second direction T. In a state where the band portion 80 is wound around the outer surface of the exterior member 30, the third end surface 80C is an end surface that faces the end surface 48A of the path restricting member 40 in the lengthwise direction thereof, and the fourth end surface 80D is an end surface that is provided opposite to the third end surface 80C in the third direction W.

For example, as shown in FIG. 5, the band portion 80 has a rectangular horizontal cross-sectional shape. For example, the band portion 80 has a size with which the band portion 80 cannot be fitted into the annular recesses 32. For example, the size of the band portion 80 in the third direction W is a size with which the band portion 80 cannot be fitted into the annular recesses 32. The size of the band portion 80 in the second direction T (i.e., the thickness of the band portion 80) is smaller than the size of the path restricting member 40 in the second direction T (i.e., the thickness of the path restricting member 40). Note that the thickness of the band portion 80 may be equal to the thickness of the path restricting member 40, or larger than the thickness of the path restricting member 40.

Figure 6:
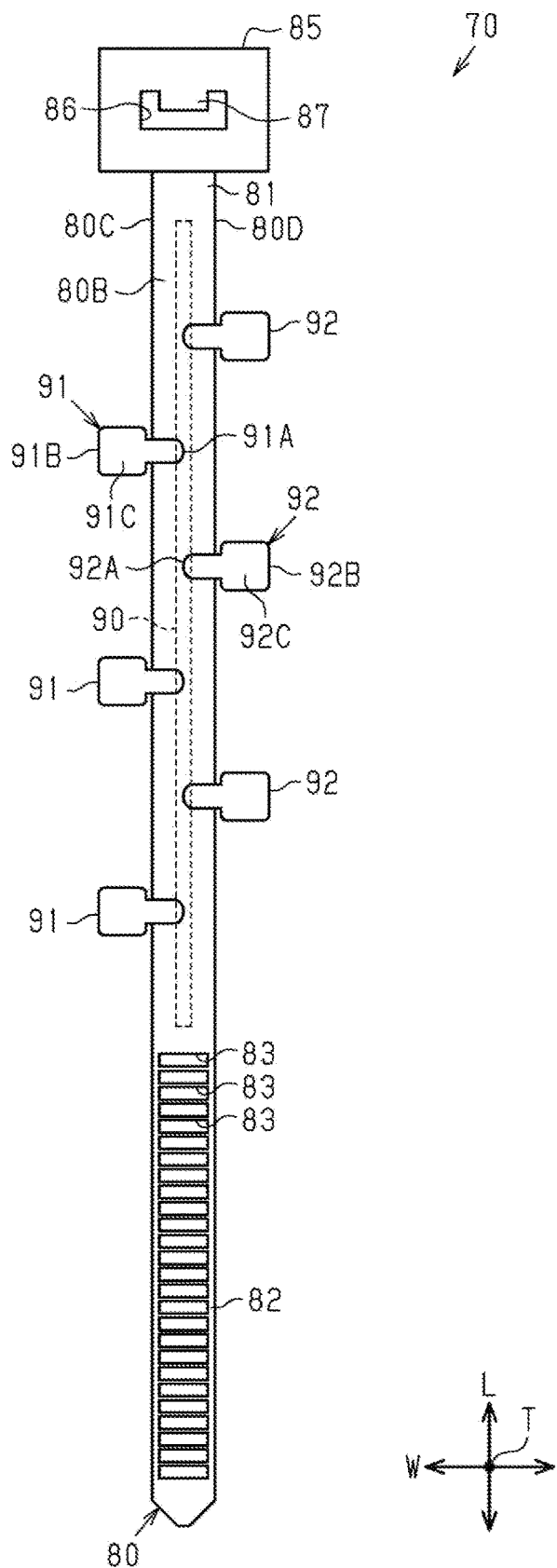
FIG. 6 is a schematic plan view showing a move restricting member according to an embodiment.

As shown in FIG. 6, the band portion 80 is provided with a plurality of engaging grooves 83. For example, each engaging groove 83 is provided in the second end surface 80B of the second end portion 82. Each engaging groove 83 is formed so as to be recessed in the second end surface 80B. Each engaging groove 83 extends in the third direction W of the band portion 80. The plurality of engaging grooves 83 are provided at intervals in the first direction L of the band portion 80. For example, the plurality of engaging grooves 83 are provided only on the second end portion 82 in the first direction L of the band portion 80. In other words, in the move restricting member 70 in the present embodiment, the portion of the band portion 80 in the first direction L where the engaging grooves 83 are formed is referred to as the second end portion 82.

As shown in FIG. 5, the move restricting member 70 has a protruding portion 90 (protrusion) that serves as a first engaging portion (first engagement). For example, the protruding portion 90 is provided on the first end surface 80A of the band portion 80. The protruding portion 90 protrudes from the first end surface 80A of the band portion 80 toward the exterior member 30. The protruding portion 90 protrudes from the first end surface 80A of the band portion 80 in the second direction T. For example, the protruding portion 90 has a rectangular horizontal cross-sectional shape.

The protruding portion 90 is formed so as to be able to be fitted into the annular recesses 32 of the exterior member 30. The protruding portion 90 is fitted into an annular recess 32, and accordingly engages with the inner surface of the annular recess 32 or side surfaces of annular protrusions 31 in the lengthwise direction of the exterior member 30. As a result, the move restricting member 70 is prevented from moving in the lengthwise direction of the exterior member 30 relative to the exterior member 30.

Figure 7:
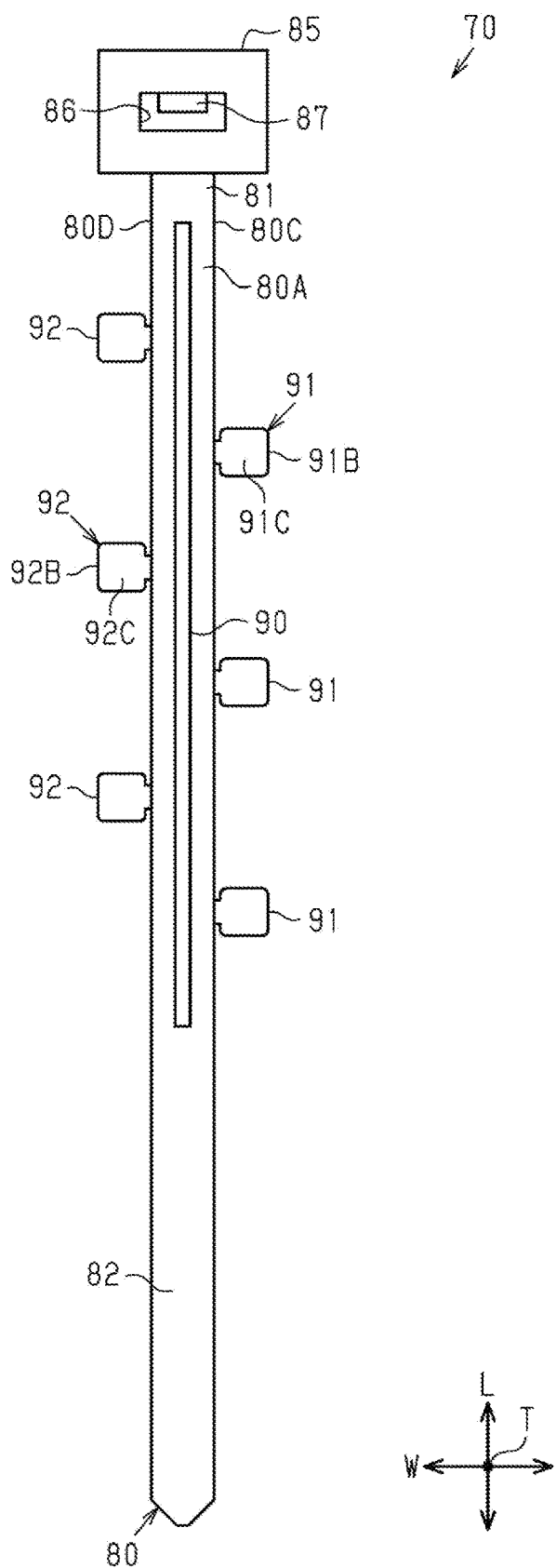
FIG. 7 is a schematic plan view showing a move restricting member according to an embodiment.

As shown in FIGS. 6 and 7, the protruding portion 90 extends in the first direction L of the band portion 80, for example. For example, the protruding portion 90 is provided on a portion of the band portion 80 in the first direction L thereof. For example, the protruding portion 90 is provided on an intermediate portion of the band portion 80 in the first direction L thereof. The protruding portion 90 is not provided on the second end portion 82 of the band portion 80. That is to say, the protruding portion 90 is not provided on the first end surface 80A of the portion where the engaging grooves 83 are provided, in the first direction L of the band portion 80. For example, the protruding portion 90 is not provided on the first end portion 81 of the band portion 80.

For example, the protruding portion 90 is provided on a portion of the band portion 80 in the third direction W thereof. For example, the protruding portion 90 has a width in the third direction W of the band portion 80. The size of the protruding portion 90 in the third direction W is smaller than the size of the band portion 80 in the third direction W. As shown in FIG. 5, the size of the protruding portion 90 in the third direction W is a size with which the protruding portion 90 can be fitted into the annular recesses 32.

As shown in FIG. 6, the move restricting member 70 is provided with one or more (three in the present embodiment) first protruding portions 91 (first protrusions) and one or more (three in the present embodiment) second protruding portions 92 (second protrusions). The first protruding portions 91 respectively protrude to positions on the outside (outward) of the band portion 80 in the third direction W with respect to the third end surface 80C. The first protruding portions 91 respectively protrude to positions on the left side in the third direction W in the figure with respect to the third end surface 80C. The second protruding portions 92 respectively protrude to positions outside the band portion 80 in the third direction W, with respect to the fourth end surface 80D. The second protruding portions 92 respectively protrude to positions on the right side in the third direction W in the figure with respect to the fourth end surface 80D. The plurality of first protruding portions 91 are provided at intervals in the first direction L of the band portion 80. The plurality of second protruding portions 92 are provided at intervals in the first direction L of the band portion 80. The first protruding portions 91 and the second protruding portions 92 are provided at different positions in the first direction L of the band portion 80. For example, the plurality of first protruding portions 91 and the plurality of second protruding portions 92 are alternatingly provided in the first direction L of the band portion 80. The first protruding portions 91 and the second protruding portions 92 are not provided on the second end portion 82 of the band portion 80.

Each first protruding portion 91 extends in the third direction W. Each first protruding portion 91 includes a base end portion 91A that is connected to the band portion 80, and a leading end portion 91B that is provided opposite to the base end portion 91A in the third direction W. Each first protruding portion 91 is formed in a cantilever shape, where the base end portion 91A is a fixed end and the leading end portion 91B is a free end. Each first protruding portion 91 has springiness. Each first protruding portion 91 is configured to be elastically deformable so that the leading end portion 91B can be displaced in the second direction T with respect to the base end portion 91A. For example, each first protruding portion 91 is configured to be able to elastically bend in the second direction T.

As shown in FIG. 5, the base end portion 91A of each first protruding portion 91 is connected to the second end surface 80B of the band portion 80, for example. The base end portion 91A protrudes from the second end surface 80B of the band portion 80 in the second direction T. For example, the base end portion 91A is formed so as to be continuously integrated with the band portion 80.

As shown in FIG. 6, the leading end portion 91B of each first protruding portions 91 has a wide portion 91C. The wide portion 91C is formed so as to be wider than portions other than the wide portion 91C of the first protruding portion 91, in the first direction L. The size of the wide portion 91C in the first direction L is larger than the size of the base end portion 91A in the first direction L. The leading end surface of the leading end portion 91B is provided farther from the third end surface 80C than the side surface of the lock portion 85 is.

As shown in FIG. 5, the leading end portion 91B of each first protruding portion 91 can come into contact with the outer surface of the path restricting member 40. For example, the wide portion 91C of the leading end portion 91B can come into contact with the outer surface of the path restricting member 40. For example, the end surface that faces the exterior member 30, of the two end surfaces of the leading end portion 91B in the second direction T, come into contact with the outer surface of the path restricting member 40. For example, the leading end portion 91B comes into contact with the outer surface of the end portion 48 of the path restricting member 40. For example, if the thickness of the band portion 80 is larger than the thickness of the path restricting member 40, the first protruding portions 91 comes into contact with the outer surface of the path restricting member 40 in a state where the leading end portion 91B is elastically deformed.

As shown in FIG. 6, each second protruding portion 92 has the same configurations as the first protruding portions 91 except that each second protruding portion 92 protrudes in the opposite direction than the direction in which the first protruding portions 91 protrude. Therefore, detailed description of the second protruding portions 92 will be omitted. Each second protruding portion 92 extends in the opposite direction than the first protruding portions 91, in the third direction W. Each second protruding portion 92 includes a base end portion 92A that is the same as the base end portion 91A, a leading end portion 92B that is the same as the leading end portion 91B, and a wide portion 92C that is the same as the wide portion 91C.

For example, the lock portion 85 is formed so that the horizontal cross-sectional shape thereof is larger than that of the band portion 80. For example, the lock portion 85 protrudes to a position that is outward of the third end surface 80C and the fourth end surface 80D of the band portion 80 in the third direction W. As shown in FIG. 2, the lock portion 85 protrudes to a position that is outward of the second end surface 80B of the band portion 80 in the second direction T. For example, the lock portion 85 is formed in a rectangular parallelepiped shape.

As shown in FIG. 5, the lock portion 85 is provided with an insertion hole 86 into which the band portion 80 can be inserted. For example, the insertion hole 86 is formed so that the second end portion 82 of the band portion 80 can be inserted thereinto. For example, the inner surface of the insertion hole 86 is provided with an engaging claw 87. The engaging claw 87 is formed so as to be able to engage with the engaging grooves 83 provided in the band portion 80. In the move restricting member 70, the engaging claw 87 of the lock portion 85 engages with one engaging groove 83 of the plurality of engaging grooves 83 provided in the band portion 80, and thus the band portion 80 is locked to the lock portion 85. For example, the size of the inner circumference of the move restricting member 70 can be changed by adjusting the degree of insertion of the band portion 80 into the lock portion 85 in the move restricting member 70. Therefore, it is possible to match the size of the inner circumference of the move restricting member 70 to the size of the outer circumference of the exterior member 30 by adjusting the degree of insertion of the band portion 80 into the lock portion 85. Also, in the move restricting member 70, the degree of tightening of the exterior member 30 by the band portion 80 can be adjusted by adjusting the degree of insertion of the band portion 80 in to the lock portion 85, for example.

In the move restricting member 70, the band portion 80 is wound around the outer circumferential surface of the exterior member 30 in a state where the second end portion 82 of the band portion 80 is inserted into the insertion hole 86 of the lock portion 85. For example, in the move restricting member 70, the band portion 80 is provided so as to be adjacent to the end surface 48A of the path restricting member 40 in the lengthwise direction, in the lengthwise direction of the exterior member 30. At this time, the third end surface 80C of the band portion 80 faces the end surface 48A in the lengthwise direction of the exterior member 30, and can engage with the end surface 48A. The band portion 80 is wound around the outer circumferential surface of the exterior member 30 so that the protruding portion 90 provided on the first end surface 80A of the band portion 80 is fitted into an annular recess 32 in the exterior member 30. For example, the band portion 80 is wound around the outer circumferential surface of the exterior member 30 so that the first end surface 80A exposed from the protruding portion 90 comes into contact with outer surfaces of an annular protrusion 31. At this time, the band portion 80 is wound around the outer circumferential surface of the exterior member 30 so that the leading end portion 91B of each first protruding portion 91 overlaps the path restricting member 40 in a radial direction of the exterior member 30, for example. For example, each first protruding portion 91 comes into contact with the outer surface of the end portion 48 of the path restricting member 40 in a state where the first protruding portion 91 is elastically deformed outward in a radial direction of the exterior member 30, in the second direction T. For example, each first protruding portion 91 is provided so as to press the path restricting member 40 from the outside of the path restricting member 40. Note that the lock portion 85 is provided at a position corresponding to the insertion port 40X of the path restricting member 40 in the circumferential direction of the exterior member 30, for example.

Configuration of Restricting Member 100

As shown in FIG. 2, the wire harness 10 includes a restricting member 100 that restricts the path restricting member 50 from moving relative to the exterior member 30, for example. A resin or metal band tie, a caulking ring, a piece of adhesive tape, or the like may be used as the restricting member 100, for example. The restricting member 100 in the present embodiment is a piece of adhesive tape. For example, the restricting member 100 is formed so as to fix the end portion that is provided opposite to the covering portion 60, of the end portions of the path restricting member 50 in the lengthwise direction thereof, to the outer surface of the exterior member 30. For example, the restricting member 100 is wound from the end portion of the path restricting member 50 in the lengthwise direction thereof to the exterior member 30. As a result, it is possible to prevent the path restricting member 50 from moving in the lengthwise direction and the circumferential direction of the wire harness main body 11 with respect to the exterior member 30.

Next, actions of the present embodiment will be described.

The move restricting member 70 is provided to restrict the path restricting member 40 from moving in the lengthwise direction of the exterior member 30 relative to the exterior member 30. The move restricting member 70 is provided with the protruding portion 90 that is fitted into an annular recess 32 of the exterior member 30, and the third end surface 80C that can engage with the end surface 48A of the path restricting member 40 in the lengthwise direction thereof. With this configuration, the protruding portion 90 of the move restricting member 70 is fitted into an annular recess 32 of the exterior member 30, and accordingly the protruding portion 90 engages with the inner surface of the annular recess 32 or side surfaces of annular protrusions 31 in the lengthwise direction of the exterior member 30. Therefore, the move restricting member 70 is prevented from moving in the lengthwise direction of the exterior member 30 relative to the exterior member 30. Also, the third end surface 80C of the move restricting member 70 is provided so as to be able to engage with the end surface 48A of the path restricting member 40 in the lengthwise direction thereof, and therefore the move restricting member 70 restricts the path restricting member 40 from moving in the lengthwise direction of the exterior member 30. Therefore, the path restricting member 40 is prevented from moving in the lengthwise direction of the exterior member 30 relative to the exterior member 30 and the move restricting member 70.

Next, effects of the present embodiment will be described.

(1) The move restricting member 70 that has the protruding portion 90 that is fitted into an annular recess 32 of the exterior member 30 and the third end surface 80C that can engage with the end surface 48A of the path restricting member 40 in the lengthwise direction thereof is provided. With this configuration, the above-described action is achieved. Therefore, it is possible to prevent the move restricting member 70 from being displaced in the lengthwise direction of the exterior member 30 with respect to the exterior member 30. Furthermore, it is possible to prevent the path restricting member 40 from being displaced in the lengthwise direction of the exterior member 30 with respect to the exterior member 30 and the move restricting member 70. Therefore, it is possible to improve the positional accuracy of the path restricting member 40 with respect to the exterior member 30, and improve the positional accuracy of the path restricting member 40 with respect to the wire harness main body 11. As a result, it is possible to desirably place the path restricting member 40 at a desirable position of the wire harness main body 11, which is in the straight section 11A in this example, and it is possible to desirably restrict the path of the straight section 11A, using the path restricting member 40. In other words, it is possible to prevent the installation position of the path restricting member 40 from being displaced from the straight section 11A with respect to the wire harness main body 11.

(2) Also, it is possible to restrict the path restricting member 40 from moving in the lengthwise direction of the exterior member 30, and therefore it is possible to desirably prevent the path restricting member 40 from becoming detached from the path restricting member 50 due to such movement.

(3) The insertion port 40X of the path restricting member 40 is open in a direction orthogonal to the lengthwise direction of the path restricting member 40, and extends over the full length of the path restricting member 40 in the lengthwise direction thereof. As a result, it is possible to attach the path restricting member 40 to the exterior member 30 from the insertion port 40X after performing terminal processing such as attaching the connectors C1 and C2 to the end portions of the electric wire member 20 in the lengthwise direction thereof. In this way, the path restricting member 40 can be retrofitted. Therefore, it is possible to improve the assembly workability of the wire harness 10.

(4) The move restricting member 70 is a cable tie that includes the band portion 80 and the lock portion 85. With this configuration, the move restricting member 70, which is a cable tie, can restrict the path restricting member 40 from moving in the lengthwise direction of the exterior member 30 relative to the exterior member 30. With the cable tie, it is easy to wind the band portion 80 around the outer circumferential surface of the exterior member 30, and therefore it is possible to improve the assembly workability of the wire harness 10.

(5) The band portion 80 has a size with which the band portion 80 cannot be fitted into the annular recesses 32. Therefore, the band portion 80 can be wound around the outer surface of the exterior member 30 in a state where the first end surface 80A of the band portion 80 is in contact with the outer surface of the exterior member 30, specifically outer surfaces of an annular protrusion 31. As a result, it is possible to easily position the move restricting member 70 in a redial direction of the exterior member 30, and stably wind the band portion 80 around the outer surface of the exterior member 30.

(6) The move restricting member 70 is provided with the first protruding portions 91 that respectively protrude to positions that are outward of the third end surface 80C of the band portion 80, and can come into contact with the outer surface of the path restricting member 40. With the first protruding portions 91, it is possible to cover the path restricting member 40 from the outside of the path restricting member 40. Therefore, for example, it is possible to desirably prevent the path restricting member 40 from moving in the lengthwise direction of the exterior member 30, climbing over the move restricting member 70. Therefore, it is possible to desirably prevent the path restricting member 40 from being displaced in the lengthwise direction of the exterior member 30 with respect to the exterior member 30.

(7) Each first protruding portion 91 is elastically deformable so that the leading end portion 91B thereof can be shifted in the second direction T with respect to the base end portion 91A thereof. Therefore, for example, even if the external size of the path restricting member 40 is changed, the amount of elastic deformation of each first protruding portion 91 is changed and the leading end portion 91B of each first protruding portion 91 can be desirably brought into contact with the outer surface of the path restricting member 40. In other words, it is possible to share one type of move restricting member 70 for a plurality of types of path restricting members 40 that have external shapes with different sizes, as a result of the amount of elastic deformation of each first protruding portion 91 being changed. Here, for example, if the thickness of the path restricting member 40 is changed, the external size of the path restricting member 40 will be changed. Therefore, by forming the first protruding portions 91 so as to be elastically deformable, it is possible to share one type of move restricting member 70 for a plurality of types of path restricting members 40 with different thicknesses.

(8) The move restricting member 70 has the plurality of first protruding portions 91 provided at intervals in the first direction L of the band portion 80. The size of the leading end portion 91B of each first protruding portion 91 is larger than the size of the base end portion 91A thereof in the first direction L, and has the wide portion 91C that can come into contact with the outer surface of the path restricting member 40. With this configuration, the respective wide portions 91C of the plurality of first protruding portions 91 cover the outer surface of the path restricting member 40. Therefore, the plurality of first protruding portions 91 can cover the path restricting member 40 from the outside of the path restricting member 40 in the circumferential direction of the exterior member 30, i.e., in a wide range in the first direction L. As a result, for example, it is possible to desirably prevent the path restricting member 40 from moving in the lengthwise direction of the exterior member 30, climbing over the move restricting member 70.

(9) The move restricting member 70 has the first protruding portions 91 and the second protruding portions 92 that protrude on the two sides of the band portion 80 in the third direction W. Therefore, it is possible to eliminate the restriction on the orientation of the band portion 80 in the third direction W when attaching the move restricting member 70 to the outer circumferential surface of the exterior member 30. For example, even if the move restricting member 70 is attached to the outer surface of the exterior member 30 so that the fourth end surface 80D of the band portion 80 faces the end surface 48A of the path restricting member 40 in the lengthwise direction thereof, the second protruding portions 92 can be brought into contact with the outer surface of the path restricting member 40. As a result, it is possible to improve the attachment workability of the move restricting member 70, and accordingly it is possible to improve the assembly workability of the wire harness 10.

(10) The plurality of engaging grooves 83 are provided on the second end portion 82 of the band portion 80, and the engaging claw 87 is provided on the inner surface of the insertion hole 86 of the lock portion 85. With this configuration, it is possible to lock the band portion 80 to the lock portion 85 by inserting the second end portion 82 of the band portion 80 into the insertion hole 86 of the lock portion 85 and engaging the engaging claw 87 of the lock portion 85 with one engaging groove 83 of the plurality of engaging grooves 83. At this time, it is possible to match the size of the inner circumference of the move restricting member 70 to the external size of the exterior member 30 by changing the degree of insertion of the band portion 80 into the lock portion 85. In other words, it is possible to share one type of move restricting member 70 for a plurality of types of exterior members 30 with different external sizes, by adjusting the degree of insertion of the band portion 80 into the lock portion 85.

(11) A portion of the second end portion 82 in the first direction L of the band portion 80, where the engaging grooves 83 are provided is not provided with the protruding portion 90. Therefore, it is possible to prevent the protruding portion 90 from interfering with the engagement of an engaging groove 83 and the engaging claw 87.

(12) The thickness of the band portion 80 is set to be smaller than the thickness of the path restricting member 40. With this configuration, it is possible to avoid an increase in the size of the wire harness 10 in a radial direction of the exterior member 30 resulting from providing the move restricting member 70.

(13) The path restricting member 40 is provided with the protruding portions 45 that protrude from the respective inner surfaces of the end portion 41 and the end portion 42 to come into contact with the outer surface of the exterior member 30. With this configuration, the exterior member 30 is pressed by the protruding portions 45 from the outside of the exterior member 30, for example. Therefore, it is possible to desirably prevent the path restricting member 40 from becoming detached from the exterior member 30 through the insertion port 40X.

Other Embodiments

The above embodiment can be modified and implemented as follows. The above embodiment and the following modifications can be implemented in combination with each other as long as no contradiction arises.

The configuration of the move restricting member 70 in the above-described embodiment may be changed as appropriate. For example, as long as the move restricting member 70 is provided with the first engaging portion that can be fitted into the annular recesses 32 and the second engaging portion (second engagement) that can engage with the end surface 48A of the path restricting member 40 in the lengthwise direction thereof, other configurations are not particularly limited.

Figure 8:
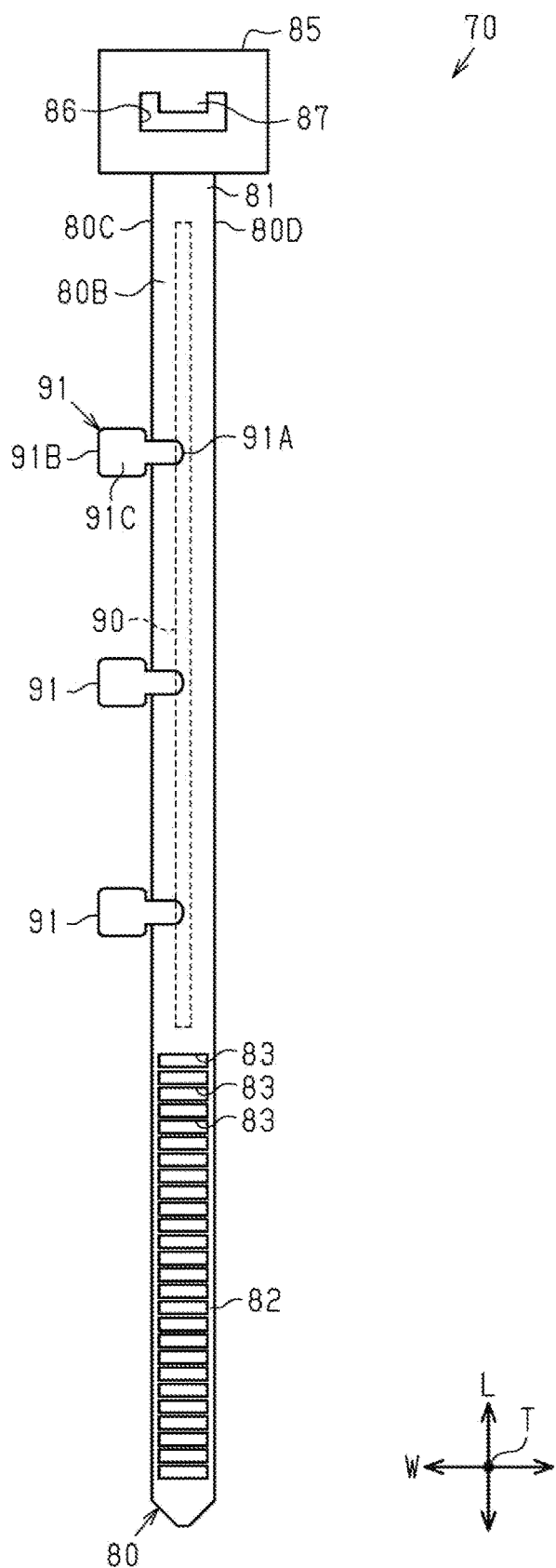
FIG. 8 is a schematic plan view showing a move restricting member according to a modification.

For example, as shown in FIG. 8, the second protruding portions 92 of the move restricting member 70 may be omitted. The move restricting member 70 in the present modification is only provided with the first protruding portions 91 that protrude to positions that are outward of the third end surface 80C of the band portion 80.

Figure 9:
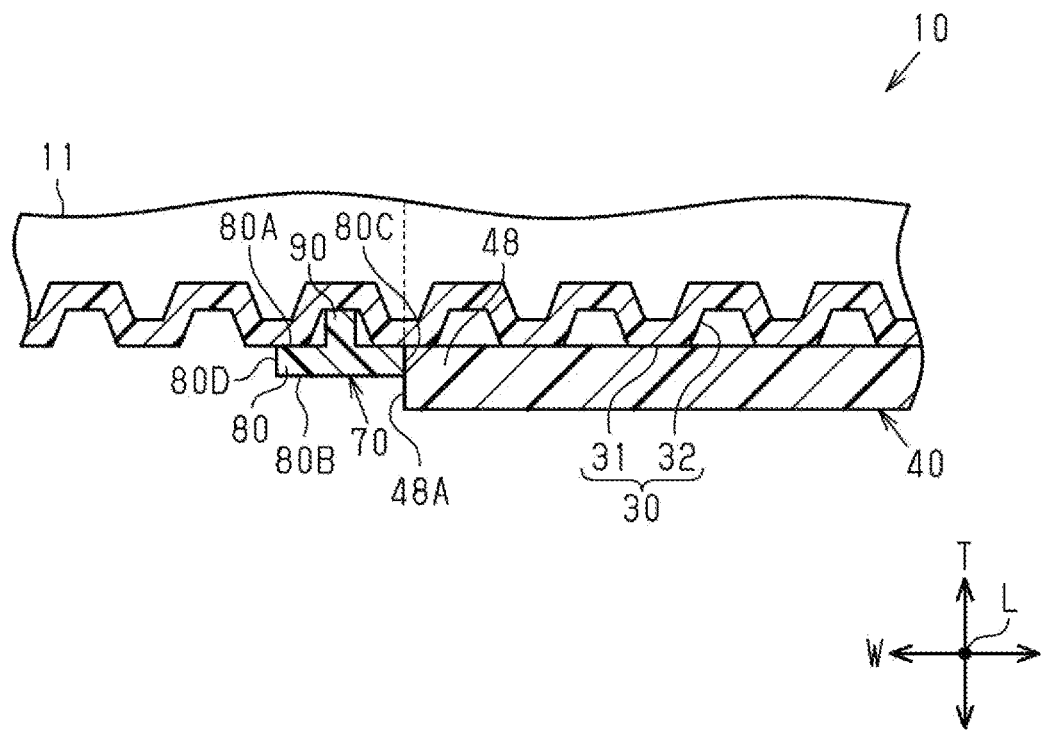
FIG. 9 is a schematic cross-sectional view showing a wire harness according to a modified example.

For example, as shown in FIG. 9, the first protruding portions 91 and the second protruding portions 92 of the move restricting member 70 may be omitted. Even in this case, the third end surface 80C of the band portion 80 can be engaged with the end surface 48A of the path restricting member 40 in the lengthwise direction thereof, in the lengthwise direction of the exterior member 30. Therefore, it is possible to prevent the path restricting member 40 from being displaced in the lengthwise direction of the exterior member 30 with respect to the exterior member 30.

Figure 10:
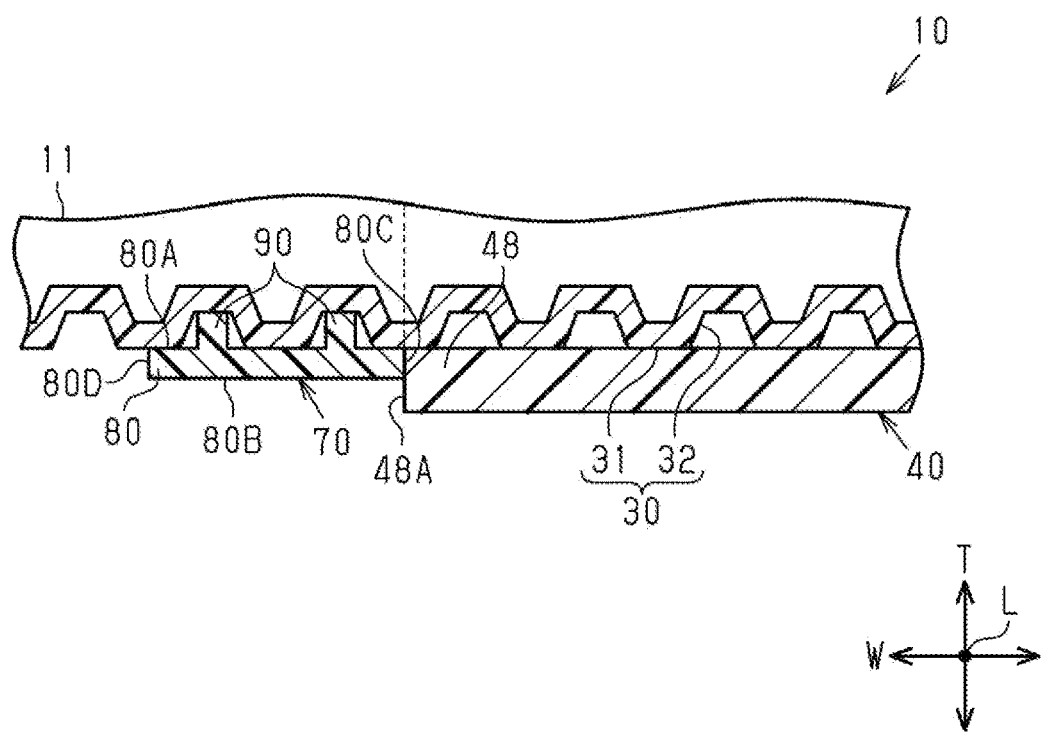
FIG. 10 is a schematic cross-sectional view showing a wire harness according to a modified example.

For example, as shown in FIG. 10, the move restricting member 70 may be provided with a plurality of protruding portions 90. For example, a plurality (two in this example)

of protruding portions 90 may be provided on the first end surface 80A of the band portion 80. For example, the plurality of protruding portions 90 are provided at intervals in the third direction W. The plurality of protruding portions 90 are formed so as to be able to be respectively fitted into different annular recesses 32, for example. For example, two protruding portions 90 are formed so as to be able to be fitted into two annular recesses 32 that are adjacent to each other in the lengthwise direction of the exterior member 30.

With this configuration, two protruding portions 90 re respectively fitted into two annular recesses 32, and two protruding portions 90 engage with sides surfaces of an annular protrusion 31 in the lengthwise direction of the exterior member 30. As a result, the move restricting member 70 is desirably prevented from moving in the lengthwise direction of the exterior member 30 relative to the exterior member 30. Therefore, it is possible to desirably prevent the move restricting member 70 from being displaced in the lengthwise direction of the exterior member 30 with respect to the exterior member 30.

In the above-described embodiment, the horizontal cross-sectional shape of the band portion 80 and the protruding portion 90 is a T shape. However, the present disclosure is not limited to such a configuration. The horizontal cross-sectional shape of the band portion 80 and the protruding portion 90 may be changed as appropriate.

Figure 11:
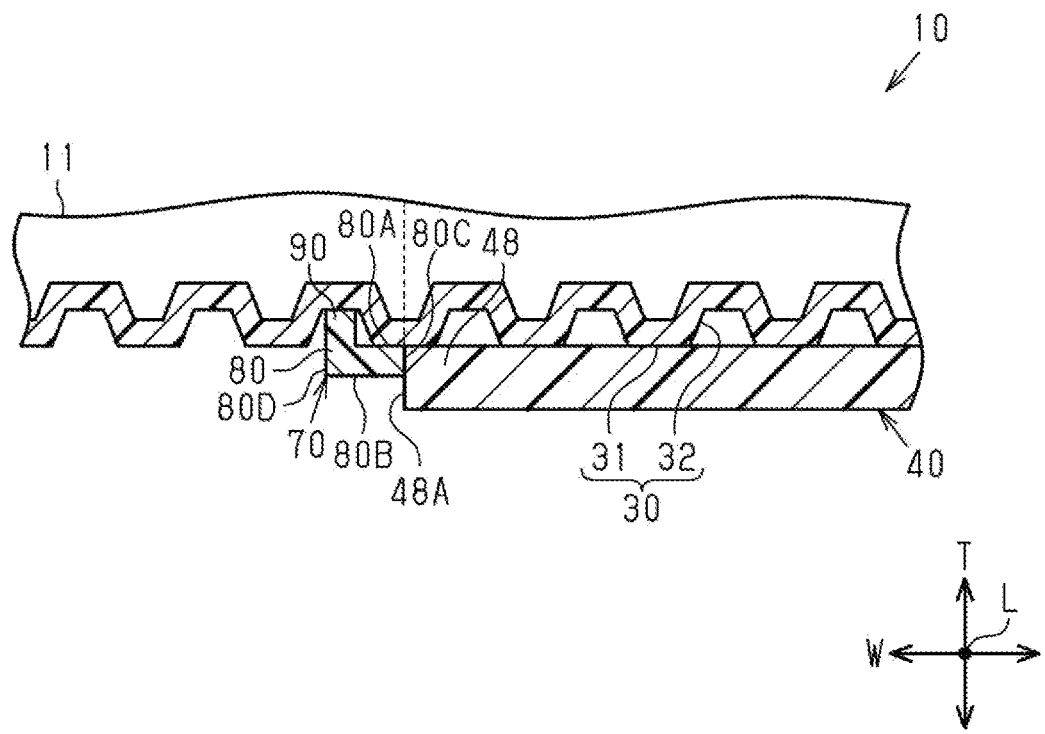
FIG. 11 is a schematic cross-sectional view showing a wire harness according to a modified example.

For example, as shown in FIG. 11, the horizontal cross-sectional shape of the band portion 80 and the protruding portion 90 may be an L shape. In the move restricting member 70 in the present modification, the protruding portion 90 is provided on the fourth end surface 80D-side end portion of the first end surface 80A of the band portion 80 in the third direction W. For example, one end surface of the protruding portion 90 in the third direction W is formed so as to be flush with the fourth end surface 80D of the band portion 80. Even in this case, the protruding portion 90 is fitted into an annular recess 32. Also, the third end surface 80C of the band portion 80 is formed so as to be able to engage with the end surface 48A of the path restricting member 40 in the lengthwise direction thereof, in the lengthwise direction of the exterior member 30. With such configurations, it is possible to prevent the move restricting member 70 from being displaced in the lengthwise direction of the exterior member 30 with respect to the exterior member 30, and it is possible to prevent the path restricting member 40 from being displaced with respect to the exterior member 30.

Figure 12:
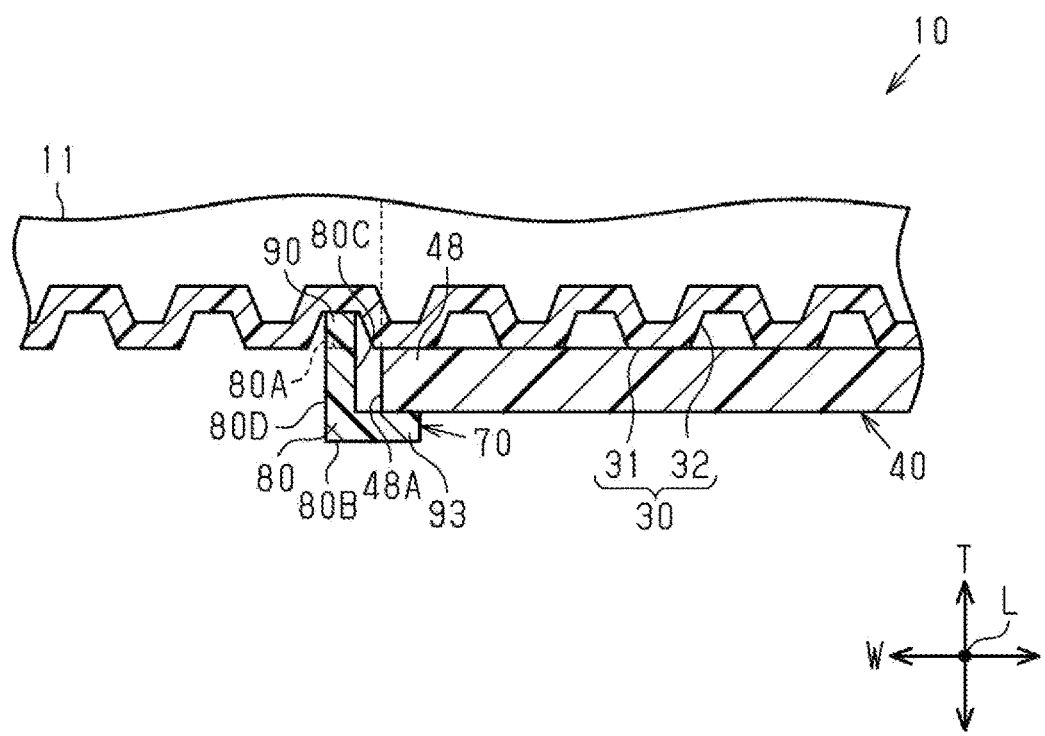
FIG. 12 is a schematic cross-sectional view showing a wire harness according to a modified example.

For example, as shown in FIG. 12, the move restricting member 70 may be provided with a protruding portion 93 (protrusion) that protrudes to a position outside the band portion 80 with respect to the third end surface 80C of the band portion 80, in the third direction W. For example, the protruding portion 93 protrudes from the third end surface 80C in one direction (to the right in this example) in the third direction W. For example, the protruding portion 93 is provided on a portion of the third end surface 80C of the band portion 80 in the second direction T. The protruding portion 93 is provided on the second end surface 80B-side end portion of the third end surface 80C of the band portion 80 in the second direction T. For example, one end surface of the protruding portion 93 in the second direction T is formed so as to be flush with the second end surface 80B. For example, the protruding portion 93 is formed so as to continuously extend to portions other than the second end portion 82 (see FIG. 6) of the band portion 80 in the first direction L. For example, the protruding portion 93 is formed so as to be able to come into contact with the outer surface of the end portion 48 of the path restricting member 40. The thickness of the band portion 80 in the present modification is larger than the thickness of the path restricting member 40. In the present modification, the size of the protruding portion 90 in the third direction W is equal to the size of the band portion 80 in the third direction W.

With this configuration, the protruding portion 90 is fitted into an annular recess 32, and the third end surface 80C of the band portion 80 is formed so as to be able to engage with the end surface 48A of the path restricting member 40 in the lengthwise direction thereof, in the lengthwise direction of the exterior member 30. With such configurations, it is possible to prevent the move restricting member 70 from being displaced in the lengthwise direction of the exterior member 30 with respect to the exterior member 30, and it is possible to prevent the path restricting member 40 from being displaced with respect to the exterior member 30. Furthermore, the move restricting member 70 is provided with the protruding portion 93 that comes into contact with the outer surface of the path restricting member 40. With the protruding portion 93, it is possible to cover the path restricting member 40 from the outside of the path restricting member 40. Therefore, it is possible to desirably prevent the path restricting member 40 from moving in the lengthwise direction of the exterior member 30, climbing over the move restricting member 70.

The horizontal cross-sectional shape of the band portion 80 and the protruding portion 90 may be an I shape. For example, the protruding portion 93 may be omitted from the move restricting member 70 shown in FIG. 12.

Figure 13:
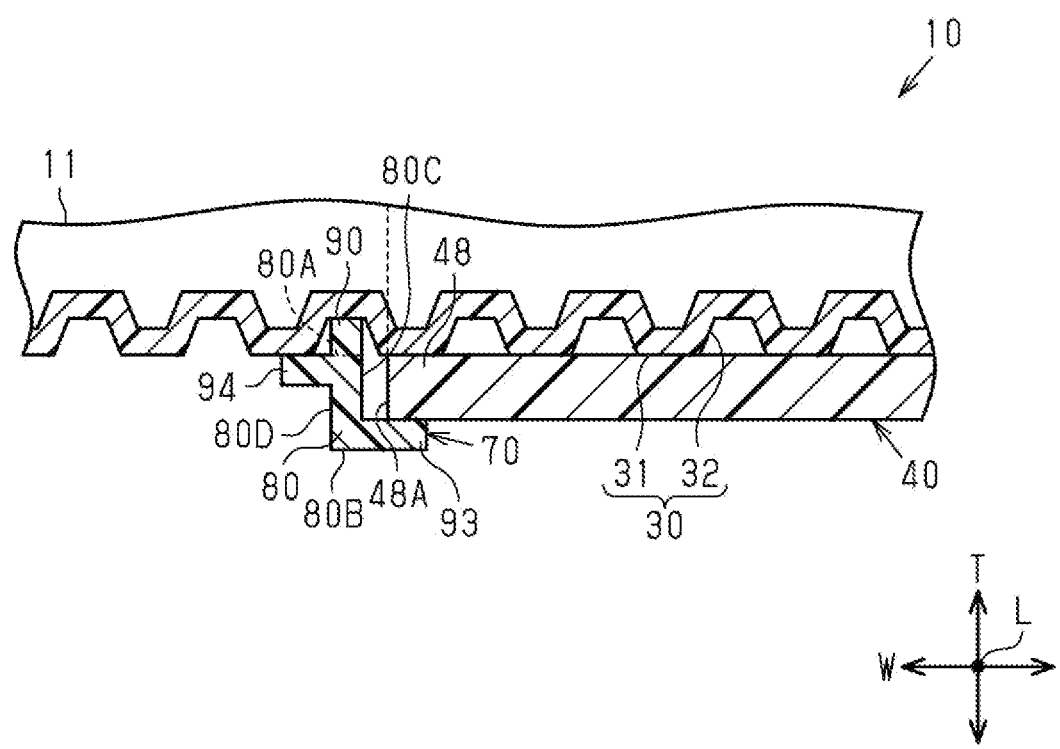
FIG. 13 is a schematic cross-sectional view showing a wire harness according to a modified example.

For example, as shown in FIG. 13, a protruding portion 94 (protrusion) that protrudes from the fourth end surface 80D of the band portion 80 of the move restricting member 70 shown in FIG. 12, in one direction (to the left in this example) in the third direction W. For example, the protruding portion 94 is provided on a portion of the fourth end surface 80D of the band portion 80 in the second direction T. The protruding portion 94 is provided on the first end surface 80A-side end portion of the fourth end surface 80D of the band portion 80 in the second direction T. For example, one end surface of the protruding portion 94 in the second direction T is formed so as to be flush with the first end surface 80A. For example, the protruding portion 94 extends in the first direction L. For example, the protruding portion 94 extends over the full length of the band portion 80 in the first direction L. For example, the protruding portion 94 is formed so as to be able to come into contact with the outer surface of an annular protrusion 31. The size of the protrusion 94 in the second direction T is smaller than the size of the band portion 80 in the second direction T. For example, the size of the protrusion 94 in the second direction T may be equal to the size of the band portion 80 in the second direction T, or larger than the size of the band portion 80 in the second direction T. Note that the protrusion 94 may be a portion of the band portion 80.

Although the above protruding portion 90 continuously extends in the first direction L of the band portion 80, the present disclosure is not limited to such a configuration. For example, protruding portions 90 may be provided so as to intermittently extend in the first direction L of the band portion 80. That is to say, protruding portions 90 may be provided on a portion of the band portion 80 at predetermined intervals in the first direction L.

The wide portion 91C of each first protruding portion 91 may be omitted. For example, each first protruding portion 91 may be formed so as to have a uniform width in the first direction L over the entire length of the first protruding portion 91 in the third direction W. Note that the second protruding portions 92 may be changed in the same manner.

The engaging grooves 83 may be provided in the first end surface 80A.

In the move restricting member 70, the third engaging portion (third engagement) of the band portion 80 is constituted by the engaging grooves 83, the fourth engaging portion (fourth engagement) of the lock portion 85 is constituted by the engaging claw 87, and the third engaging portion and the fourth engaging portion engage with each other. However, the protrusion-recess relationship may be the other way around.

The restricting member 100 may be changed to the move restricting member 70. That is to say, the move restricting member 70 may be used as a move restricting member that restricts the path restricting member 50 from moving in the lengthwise direction of the exterior member 30 relative to the exterior member 30.

The restricting member 100 may be omitted.

Although the move restricting member 70 is embodied as a cable tie that includes the band portion 80 and the lock portion 85, the present disclosure is not limited to such a configuration. For example, the move restricting member 70 may be changed to a ring member of the move restricting member 70 whose inner circumference has a fixed size.

The configuration of the path restricting member 50 in the above-described embodiment may be changed as appropriate. For example, the bent shape of the main body portion 51 may be changed as appropriate. For example, the horizontal cross-sectional shape of the inner surface of the main body portion 51 may be changed as appropriate.

In the path restricting member 50, the main body portion 51 (the covering main body portion 61) and the lid portion 62 are formed integrally with each other. However, the present disclosure is not limited to such a configuration, and the main body portion 51 and the lid portion 62 may be separated. That is to say, the main body portion 51 and the lid portion 62 may be separate parts.

The lid portion 62 of the path restricting member 50 may be omitted.

The path restricting member 50 may be provided with a lid portion that is coupled to the main body portion 51 other than the covering main body portion 61.

The path restricting member 50 may be omitted. If this is the case, move restricting members 70 may be respectively provided on two end portions 47 and 48 of the path restricting member 40 in the lengthwise direction thereof.

The configuration of the path restricting member 40 in the above-described embodiment may be changed as appropriate. For example, as long as the path restricting member 40 has the insertion port 40X and is configured to be attachable to the outer circumferential surface of the exterior member 30, other configurations are not specifically limited.

Each protruding portion 45 may be provided at a position farther from the insertion port 40X than the leading end 41A of the end portion 41 is in the circumferential direction of the path restricting member 40.

Each protruding portion 45 may be provided on a portion of the path restricting member 40 in the lengthwise direction thereof.

At least one of the two protruding portions 45 may be omitted.

The path restricting member 40 may be provided with a second protruding portion that protrudes from the inner surface of the coupling portion 43 and comes into contact with the outer surface of the exterior member 30. With this configuration, it is possible to make the protruding portion 45 and the second protruding portion come into contact with the outer surface of the exterior member 30. Therefore, it is possible to prevent the path restricting member 40 from rattling.

The path restricting member 40 may be provided with a groove that extends in the lengthwise direction of the coupling portion 43 on the outer surface of the coupling portion 43. With this configuration, it is easier to deform the coupling portion 43 toward the outer circumferential surface at the groove, and it is possible to make it easier to expand the insertion port 40X. As a result, it is possible to contribute to the improvement of the assemble workability of the path restricting member 40.

The thickness of the coupling portion 43 in a radial direction thereof may be configured to vary in the circumferential direction thereof.

The horizontal cross-sectional shape of the coupling portion 43 is not limited to an arc shape, and may be changed to an ellipsoidal arc shape, a U shape, or the like, for example.

In the above-described embodiment, the path restricting members 40 and 50 are more rigid than the exterior member 30. However, the present disclosure is not limited to such a configuration, and the path restricting members 40 and 50 may be as rigid as the exterior member 30, or less rigid than the exterior member 30. That is to say, as long as the path restricting members 40 and 50 make the wire harness main body 11 less bendable than when the path restricting members 40 and 50 are not attached to the wire harness main body 11, the path restricting members 40 and 50 do not necessarily have to be more rigid than the exterior member 30.

For example, the exterior member 30 may be a resin corrugated tube with a metal layer that contains a metal material, formed on the outer surface thereof.

The exterior member 30 in the above-described embodiment is embodied as a resin corrugated tube. However, the present disclosure is not limited to such a configuration. For example, as long as the exterior member 30 has a bellowed shape in which the annular protrusions 31 and the annular recesses 32 are alternatingly arranged in the lengthwise direction of the exterior member 30, the exterior member 30 is not limited to being a corrugated tube. Also, the bellowed shape in which the annular protrusions 31 and the annular recesses 32 are alternatingly arranged may be provided on a portion of the exterior member 30 in the lengthwise direction thereof.

The exterior member 30 may have a slit that extends in the lengthwise direction of the exterior member 30.

Although the above electric wires 21 are high-voltage electric wires, the present disclosure is not limited to such a configuration. For example, the electric wires 21 may be low-voltage electric wires.

In the electric wire member 20, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 may be omitted.

The number of electric wires 21 included in the above electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

A plurality of on-board devices to which the wire harness 10 is to be electrically connected are embodied above as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
   a wire harness main body that includes an electric wire and an exterior tube that encloses an outer circumferential surface of the electric wire;
   a first tubular path restricting member that is attached to an outer circumferential surface of the exterior tube and restricts a path of the wire harness main body;
   a move restricting member that is attached to the outer circumferential surface of the exterior tube and restricts the first path restricting member from moving in a lengthwise direction of the exterior tube relative to the exterior tube; and
   a fixing member attached to the outer circumferential surface of the exterior tube and configured to restrict movement of the exterior tube relative to a first end of the first tubular path restricting member, wherein:
   the exterior tube has a bellowed shape in which annular protrusions and annular recesses are alternatingly arranged in the lengthwise direction of the exterior tube,
   the first path restricting member includes an insertion port that is open in a direction orthogonal to a lengthwise direction of the path restricting member, and extends over a full length of the path restricting member in the lengthwise direction of the path restricting member, and
   the move restricting member includes (i) a first engagement that is fitted into one of the annular recesses and (ii) a second engagement that is connected to the first engagement, the second engagement being positioned to engage with an end surface of a second end of the first path restricting member in the lengthwise direction of the first path restricting member.

2. The wire harness according to claim 1, wherein:
   the move restricting member is a cable tie that includes:
   a band that extends in a first direction corresponding to a circumferential direction of the exterior tube, has a thickness in a second direction corresponding to a radial direction of the exterior tube, and has a width in a third direction corresponding to the lengthwise direction of the exterior tube; and
   a lock that is integrated with the band and is provided on a first end of the band in the first direction,
   the band has a first end surface that faces an outer surface of the exterior tube in the second direction, and a second end surface that is provided opposite to the first end surface in the second direction, and
   the first engagement is a protrusion that protrudes from the first end surface toward the exterior tube.

3. The wire harness according to claim 2, wherein:
   the band has a larger size than the protrusion in the third direction, and
   the band has a size with which the band cannot be fitted into the annular recesses.

4. The wire harness according to claim 2, wherein:
   the band has a third end surface that faces an end surface of the path restricting member in the lengthwise direction thereof, in the third direction, and a fourth end surface that is provided opposite to the third end surface in the third direction, and
   the second engagement is the third end surface.

5. The wire harness according to claim 4, wherein:
   the move restricting member is provided with a protrusion that protrudes to a position outside the band with respect to the third end surface of the band, in the third direction, and
   the protrusion is configured to contact an outer surface of the path restricting member.

6. The wire harness according to claim 5, wherein:
   the protrusion includes a base end that extends in the third direction and is one end in the third direction connected to the band, and a leading end that is provided opposite to the base end in the third direction, and
   the protrusion is elastically deformable so as to allow the leading end to be shifted in the second direction with respect to the base end.

7. The wire harness according to claim 6, wherein:
   the protrusion is a plurality of protrusions, and
   the plurality of protrusions are provided at intervals in the first direction of the band.

8. The wire harness according to claim 6, wherein:
   the leading end of the protrusion includes a wide portion that has a larger size in the first direction than the base end of the protrusion, and
   the wide portion is configured to contact an outer surface of the path restricting member.

9. The wire harness according to claim 5, wherein:
   the protrusion is a first protrusion,
   the move restricting member is provided with a second protrusion that protrudes to a position outside the band with respect to the fourth end surface of the band, in the third direction, and
   the second protrusion extends in an opposite direction than the first protrusion, in the third direction, and is configured to contact an outer surface of the path restricting member.

10. The wire harness according to claim 2, wherein:
    the band includes a first end to which the lock is connected, and a second end that is provided opposite to the first end in the first direction,
    the second end is provided with a plurality of third engagements provided at intervals in the first direction of the band,
    the lock is provided with an insertion hole into which the second end of the band is configured to be inserted, and a fourth engagement that is provided on an inner surface of the insertion hole and is configured to engage with the third engagement, and
    the first engagement is not provided on the second end.

11. The wire harness according to claim 1, wherein the fixing member is attached to the outer circumferential surface of the exterior tube via a second tubular path restricting member.

12. The wire harness according to claim 1, wherein the fixing member is directly attached to the outer circumferential surface of the exterior tube.

13. The wire harness according to claim 1, further comprising a second path restricting member that includes a covering portion that covers a portion of the first path restricting member.

14. The wire harness according to claim 1, wherein the first path restricting member defines a straight section of the path of the wire harness main body.

* * * * *